(12) United States Patent
Lee et al.

(10) Patent No.: US 12,481,456 B2
(45) Date of Patent: Nov. 25, 2025

(54) EMBEDDED STORAGE DEVICE, HOST SYSTEM HAVING THE SAME, AND METHOD OF OPERATING THE SAME

(71) Applicant: Samsung Electronics Co., Ltd., Suwon-si (KR)

(72) Inventors: Kwangjin Lee, Suwon-si (KR); Kirock Kwon, Suwon-si (KR); Younsoo Cheon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 18/048,696

(22) Filed: Oct. 21, 2022

(65) Prior Publication Data

US 2023/0376247 A1 Nov. 23, 2023

(30) Foreign Application Priority Data

May 18, 2022 (KR) .......................... 10-2022-0060997

(51) Int. Cl.
*G06F 3/06* (2006.01)
(52) U.S. Cl.
CPC .......... *G06F 3/0659* (2013.01); *G06F 3/0613* (2013.01); *G06F 3/0656* (2013.01); *G06F 3/0683* (2013.01)
(58) Field of Classification Search
CPC .... G06F 3/0659; G06F 3/0613; G06F 3/0656; G06F 3/0683
See application file for complete search history.

(56) References Cited

U.S. PATENT DOCUMENTS

| | | | |
|---|---|---|---|
| 6,839,360 B2* | 1/2005 | Allwright | G06F 11/08 370/429 |
| 7,679,133 B2 | 3/2010 | Son et al. | |
| 8,553,466 B2 | 10/2013 | Han et al. | |
| 8,559,235 B2 | 10/2013 | Nam et al. | |
| 8,654,587 B2 | 2/2014 | Yoon et al. | |
| 8,918,580 B2* | 12/2014 | Cheon | G06F 12/0868 711/119 |
| 9,536,970 B2 | 1/2017 | Seol et al. | |

(Continued)

FOREIGN PATENT DOCUMENTS

KR 101026634 B1 4/2011

*Primary Examiner* — Idriss N Alrobaye
*Assistant Examiner* — Richard B Franklin
(74) *Attorney, Agent, or Firm* — Wolf, Greenfield & Sacks, P.C.

(57) ABSTRACT

A host system includes a volatile memory device configured to store first temporary data, an embedded storage device configured to store second temporary data, and a host device configured to determine whether to transmit new temporary data to the nonvolatile memory device for storage therein as the first temporary data or to the embedded storage device for storage therein as the second temporary data in response to a detection signal of an event associated with the new temporary data. The embedded storage device may include at least one nonvolatile memory device having a buffer area, in which the second temporary data is stored, and a user area, and a controller configured to control the at least one nonvolatile memory device such that the second temporary data in the buffer area is copied to the user area in response to a flush request of the host device.

18 Claims, 14 Drawing Sheets

(56) References Cited

U.S. PATENT DOCUMENTS

| | | |
|---|---|---|
| 10,783,090 B2 | 9/2020 | Lee et al. |
| 11,126,379 B2 | 9/2021 | Kim |
| 11,150,822 B2 | 10/2021 | Lee |
| 11,410,475 B2 * | 8/2022 | Golov ................. B60R 21/0136 |
| 2008/0215800 A1 | 9/2008 | Lee et al. |
| 2009/0327591 A1 | 12/2009 | Moshayedi |
| 2012/0297121 A1 | 11/2012 | Gorobets et al. |
| 2013/0138870 A1 | 5/2013 | Yoon et al. |
| 2013/0326125 A1 | 12/2013 | Chang et al. |
| 2019/0034330 A1 | 1/2019 | Natarajan et al. |
| 2020/0285407 A1 | 9/2020 | Lee et al. |
| 2021/0263674 A1 | 8/2021 | Shin et al. |
| 2021/0365202 A1 | 11/2021 | Shin et al. |

* cited by examiner

EMBEDDED STORAGE DEVICE, HOST SYSTEM HAVING THE SAME, AND METHOD OF OPERATING THE SAME

CROSS-REFERENCE TO RELATED APPLICATION(S)

This application claims benefit of priority to Korean Patent Application No. 10-2022-0060997 filed on May 18, 2022 in the Korean Intellectual Property Office, the disclosure of which is incorporated herein by reference in its entirety.

BACKGROUND

The present disclosure relates to an embedded storage device, a host system including the same, and a method of operating the same In general, a storage device including a nonvolatile memory device is widely used in a universal serial bus (USB) drive, a digital camera, a mobile phone, a smartphone, a personal computer (PC), a table PC, a memory card, a solid state drive (SSD), and the like. A storage device is useful in storing or moving a large amount of data. Recently, storage devices have been miniaturized to facilitate implementation in an embedded form in electronic devices.

SUMMARY

Example embodiments provide an embedded storage device improving retention of temporary data associated with a specific event, a host system including the same, and a method of operating the same.

According to an example embodiment, a host system includes: a volatile memory device configured to store first temporary data; an embedded storage device configured to store second temporary data; and a host device configured to determine whether to transmit new temporary data to the nonvolatile memory device for storage therein as the first temporary data or to the embedded storage device for storage therein as the second temporary data in response to a detection signal of an event associated with the new temporary data. The embedded storage device may include: at least one nonvolatile memory device having a buffer area, in which the second temporary data is stored, and a user area; and a controller configured to control the at least one nonvolatile memory device such that the second temporary data in the buffer area is copied to the user area in response to a flush request of the host device.

According to an example embodiment, a method of operating an embedded storage device includes: receiving a write request from a host device; transmitting temporary data, corresponding to the write request, to a buffer memory; writing the temporary data of the buffer memory to a buffer area; and copying the temporary data in the buffer area to a user area when an event occurs.

According to an example embodiment, a method of operating a host device includes: determining one of a volatile memory buffer area and a nonvolatile memory buffer area as a buffer space for temporary data in response to a detection signal of an event; writing the temporary data to the nonvolatile memory buffer area when the detection signal indicates detection of the event; and flushing the temporary data in the nonvolatile memory buffer area to a nonvolatile memory user area.

According to an example embodiment, an embedded storage device includes: a buffer memory configured to receive temporary data from a host device associated with a specific event; at least one nonvolatile memory device having a buffer area, including a single-level cell (SLC), and a user area including a multilevel cell (MLC); and a controller configured to program the temporary data to a first memory block of the buffer area, to read the temporary data from the first memory block in response to a flush request of the host device, to correct an error in the read data, and to program the error-corrected data to a second memory block of the user area.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
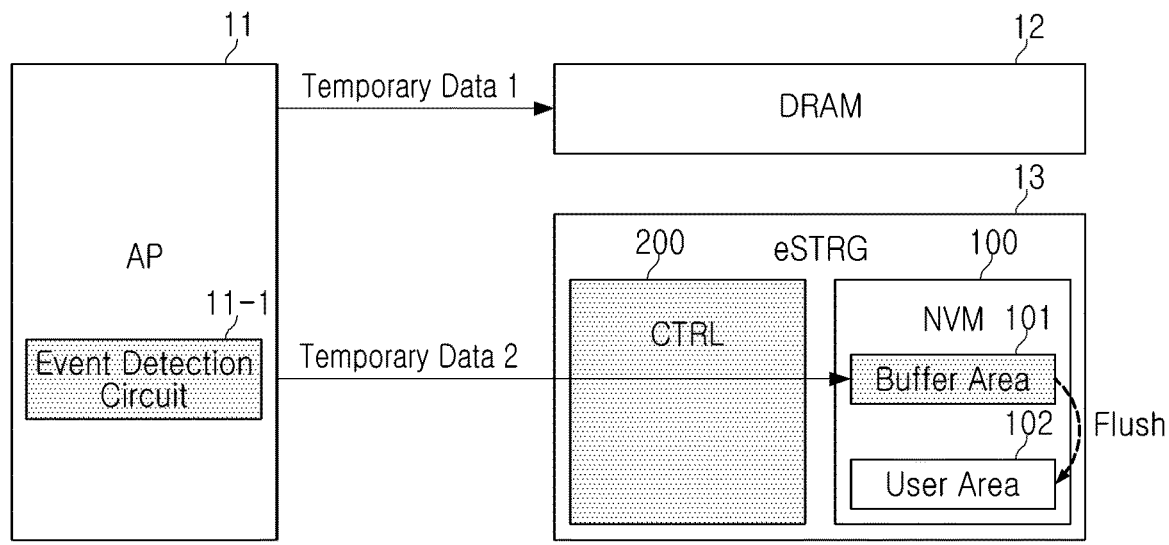
FIG. 1 is a view illustrating a host system according to an example embodiment.

Hereinafter, example embodiments will be described with reference to the accompanying drawings. In the drawings, like numerals refer to like elements throughout this application and repeated descriptions may be omitted. It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination.

In general, an autonomous driving system collects road conditions, obstacles, traffic information, and the like, using various sensors, such as a light detection and ranging (LIDAR), a radar, and a camera, and processes the collected information into information used for autonomous driving. With the development of autonomous driving technology, the amount of data to be processed, such as image information and sensor information, has been increased. A typical volatile memory, for example, a dynamic random access memory (DRAM), may buffer data which is not confirmed to be stored. In addition, when a specific event, such as a crash accident occurs, temporary data may be stored in a nonvolatile memory (for example, a NAND flash memory)-based storage device (for example, a solid state drive (SDD)) or a hard disk drive (HDD). Therefore, even process-completed data may need to be retained in the DRAM for a predetermined time. Development of autonomous driving technology may cause the amount of data, which needs to be retained, to increase. Thus, the capacity of a DRAM in an autonomous driving system may continue to increase.

In a storage device according to an example embodiment, a host system including the same, and a method of operating the same, some functions of a DRAM, such as, for example, temporary data buffering, may be performed when a predetermined event occurs. Accordingly, the host system according to an example embodiment may increase storage capacity of temporary data while maintaining the capacity of the DRAM.

FIG. 1 is a view illustrating a host system 10 according to an example embodiment. Referring to FIG. 1, a host system 10 may include a host device (AP) 11, a volatile memory device (DRAM) 12, and a storage device (eSTRG) 13.

The host system 10 may be implemented as a server computer, a personal computer (PC), a desktop computer, a laptop computer, a workstation computer, a network-attached storage (NAS), a data center, an Internet data center (IDC), and/or a mobile computing device. For example, the mobile computing device may be implemented as a smartphone, a tablet PC, and/or a mobile internet device (MID).

The host device (AP) 11 may be configured to control the overall operation of the host system 10. The host device 11 may be configured to control a data processing operation (for example, a write operation or a read operation) of the volatile memory device 12 and the storage device 13. The host device 11 may include at least one central processing unit (CPU), a buffer memory, a memory device, a memory controller, an interface circuit, and the like. The host device 11 may be implemented as an integrated circuit (IC), a mainboard, or a system-on-chip (SoC). According to an example embodiment, the host device 11 may be implemented as an application processor or a mobile application processor.

The CPU may exchange commands/data with the buffer memory, the memory controller, and the interface circuit via a bus architecture. In an example embodiment, the bus architecture may be an Advanced Microcontroller Bus Architecture (AMBA), an AMBA Advanced eXtensible Interface (AXI), and/or AMBA Advanced High-performance Bus (AHB). The buffer memory may be configured to store a queue. In an example embodiment, the buffer memory may be implemented as a register or a static random access memory (SRAM). The queue may include a submission queue. The queue may store commands (for example, a write command and a read command). In an example embodiment, the queue may further include a completion queue. The memory controller may be configured to write data to or read data stored in the volatile memory device 12 and the storage device 13 according to the control of the CPU. In an example embodiment, the memory controller may be configured to implement one or more functions of a direct memory access (DMA) controller. The interface circuit may be connected to a host interface circuit of each of the volatile memory device 12 and the storage device 13 through a predetermined interface. In an example embodiment, the predetermined interface may include at least one of nonvolatile memory express (NVMe), peripheral component interconnect express (PCIe), serial at attachment (SATA), small computer system interface (SCSI), serial attached SCSI (SAS), universal storage bus (USB) attached SCSI (UAS), Internet small computer system interface (iSCSI), Fiber Channel, and/or fiber channel over Ethernet (FCoE).

The host device (AP) 11 may include an event detection circuit 11-1. The event detection circuit 11-1 may be configured to detect whether an event associated with a change in the storage space of temporary data has occurred. When the host system 10 is an autonomous driving system, the event detection circuit 11-1 may recognize an accident event to generate a detection signal. In another embodiment, the event detection circuit 11-1 may predict a situation, in which a large amount of temporary data is continuously required, and may generate a detection signal based on the predicted situation. However, it should be understood that the detection signal generation situation of the event detection circuit 11-1 is not limited to these examples. For example, when the capacity of the temporary data is greater than a predetermined value, a detection signal may be generated. Also, a detection signal may be generated according to environment information associated with generation of temporary data.

The host device 11 may be configured to determine whether to store temporary data in the volatile memory device 12 or the storage device 13 in response to the detection signal of the event detection circuit 11-1. For example, the host device 11 may be configured to transmit first temporary data to the volatile memory device 12 when an event does not occur, for example, for a normal ambient state. On the other hand, the host device 11 may be configured to transmit second temporary data to the storage device 13 when an event occurs.

The volatile memory device 12 may be configured to store the first temporary data of the host device 11. In an example embodiment, the volatile memory device 12 may be a DRAM.

The storage device (eSTRG) 13 may include at least one nonvolatile memory device (NVM) 100 and a controller (CTRL) 200. In an example embodiment, the storage device 13 may be an embedded storage device.

The at least one nonvolatile memory device (NVM) 100 may be configured to store data. The nonvolatile memory device 100 may be a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer torque random access memory (STT-RAM), and/or the like. Hereinafter, for ease of description, the nonvolatile memory device 100 will be referred to as a vertical NAND flash memory device (VNAND).

In addition, the nonvolatile memory device (NVM) 100 may include a buffer area 101 and a user area 102. The buffer area 101 may be an area in which the second temporary data is stored. The second temporary data may be temporary data associated with an event. In an example embodiment, the buffer area 101 may not be set to the storage capacity of the storage device 13.

The controller (CTRL) 200 may be connected to the at least one nonvolatile memory device 100 through a plurality of control pins transmitting control signals (for example, CLE, ALE, CE(s), WE, RE, and the like). Also, the controller 200 may be configured to control the nonvolatile memory device 100 using control signals CLE, ALE, CE(s), WE, RE, and the like). For example, the nonvolatile memory device 100 may latch a command CMD or an address ADD at an edge of a write enable signal WE according to a command latch enable signal CLE and an address latch enable signal ALE to perform program/read/erase operations. For example, the chip enable signal CE may be enabled in the read operation, the command latch enable signal CLE may be enabled during a command transmission period, the address latch enable signal ALE may be enabled during an address transmission period, and a read enable signal RE may be toggled during a period in which data is transmitted through a data signal line DQ. The data strobe signal DQS may be toggled at a frequency corresponding to a data input/output speed. Read data may be sequentially transmitted in synchronization with a data strobe signal DQS.

The controller (CTRL) 200 may be configured to control the overall operation of the storage device 13. The controller 200 may be configured to perform various management operations, such as such as cache/buffer management, firmware management, garbage collection management, wear-leveling management, data deduplication management, read refresh/reclaim management, bad block management, multistream management, host data and nonvolatile memory mapping management, quality of service (QoS) management, system resource allocation management, nonvolatile memory queue management, read level management, erase/program management, hot/cold data management, power loss protection management, dynamic thermal management, initialization management, and/or redundant array of inexpensive disk (RAID) management.

The controller (CTRL) 200 may be configured to arrange the second temporary data in the buffer area 101, in a round-robin manner, a weighted round-robin manner, a fixed priority manner, or a striping manner.

The controller (CTRL) 200 may be implemented to perform a flush operation of moving the second temporary data of the buffer area 101 to the user area 102, based on a request of the host device 11 or an internal scheme. Such a flush operation may include an off-chip flush operation or an on-chip flush operation. The off-chip flush operation may include a read operation of reading temporary data stored in the buffer area 101 of the nonvolatile memory device 100 by the controller 200 and a program operation of correcting an error of the read operation and programming the corrected data to the user area 102 of the nonvolatile memory device 100. The on-chip flush operation may include a copy-back program operation of programming the temporary data of the buffer area 101 to the user area 102 in response to a flush request. However, it should be understood that the flush operation is not limited to these examples.

As described above, the storage device 13 according to an example embodiment may serve to store the second temporary data when an event occurs.

The host system 10, according to an example embodiment, may be configured to change the storage space in which the temporary data is stored based on whether an event occurs, configured to satisfy a need for increasing storage capacity of the temporary data, and configured to economically manage corresponding data.

Figure 2:
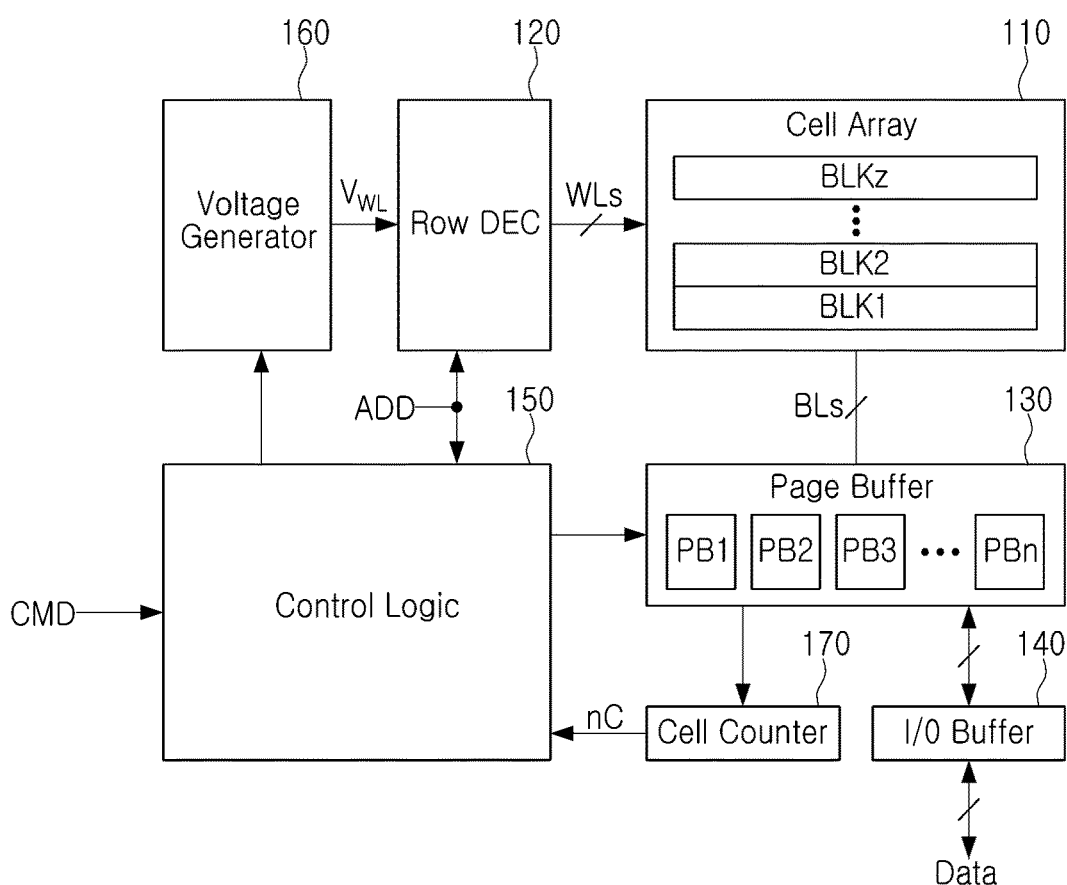
FIG. 2 is a view illustrating a nonvolatile memory device according to an example embodiment.

FIG. 2 is a view illustrating a nonvolatile memory device 100 according to an example embodiment. Referring to FIG. 2, the nonvolatile memory device 100 may include a memory cell array 110, a row decoder 120, a page buffer circuit 130, an input/output circuit 140, a control logic 150, and a voltage generator 160, and a cell counter 170.

The memory cell array 110 may be connected to the row decoder 120 through wordlines WLs or select lines SSL and GSL. The memory cell array 110 may be connected to the page buffer circuit 130 through bitlines BLs. The memory cell array 110 may include a plurality of cell strings. A channel of each of the cell strings may be formed in a vertical or horizontal direction. Each of the cell strings may include a plurality of memory cells. The plurality of memory cells may be programmed, erased, or read by a voltage applied to the bitline BLs or the wordline WLs. In general, a program operation is performed in units of pages, and an erase operation is performed in units of blocks. Detailed descriptions of the memory cells are disclosed in U.S. Pat. Nos. 7,679,133, 8,553,466, 8,654,587, 8,559,235, and 9,536,970 the disclosures of which are incorporated herein by reference. In an example embodiment, the memory cell array 330 may include a two-dimensional memory cell array, and the two-dimensional memory cell array may include a plurality of NAND strings disposed in a row direction and a column direction.

The row decoder 120 may be implemented to select one of the memory blocks BLK1 to BLKz of the memory cell array 110 in response to the address ADD. The row decoder 120 may select one of the wordlines of the selected memory block in response to the address ADD. The row decoder 120 may transfer a wordline voltage VWL, corresponding to an operation mode, to the wordline of the selected memory block. During the program operation, the row decoder 120 may apply a program voltage and a verify voltage to the selected wordline and may apply a pass voltage to an unselected wordline. During a read operation, the row decoder 120 may apply a read voltage to a selected wordline and may apply a read pass voltage to an unselected wordline.

The page buffer circuit 130 may be configured to operate as a write driver or a sensing amplifier. During the program operation, the page buffer circuit 130 may apply a bitline voltage, corresponding to data to be programmed, to bitlines of the memory cell array 110. During a read operation or a verify read operation, the page buffer circuit 130 may sense data, stored in the selected memory cell, through the bitline BL. Each of a plurality of page buffers, included in the page buffer circuit 130, may be connected to at least one bitline.

The input/output circuit 140 may be configured to provide externally provided data to the page buffer circuit 130. The input/output circuit 140 may provide an externally provided command CMD to the control logic 150 (see FIG. 1). The input/output circuit 140 may provide an externally provided address ADD to the control logic 150 or the row decoder 120. Also, the input/output circuit 140 may output data, sensed and latched by the page buffer circuit 130, to an external entity.

The control logic 150 may be configured to control the row decoder 120, the page buffer circuit 130, and the voltage generator 160 in response to the command CMD transmitted from the controller 200. Also, the control logic 150 may be implemented to perform a cell count-based dynamic read operation.

The voltage generator 160 may be configured to generate various types of wordline voltages to be applied to respective wordlines under the control of the control logic 150, and a well voltage to be supplied to a bulk (for example, a well region) in which memory cells are formed. The wordline voltages, respectively applied to the wordlines, may include a program voltage, a pass voltage, a read voltage, and a read pass voltage.

The cell counter 170 may be configured to count memory cells, corresponding to a specific threshold voltage range from data sensed by the page buffer circuit 130. For example, the cell counter 170 may count the number of memory cells having a threshold voltage in a specific threshold voltage range by processing data sensed in each of the plurality of page buffers PB1 to PBn.

Figure 3:
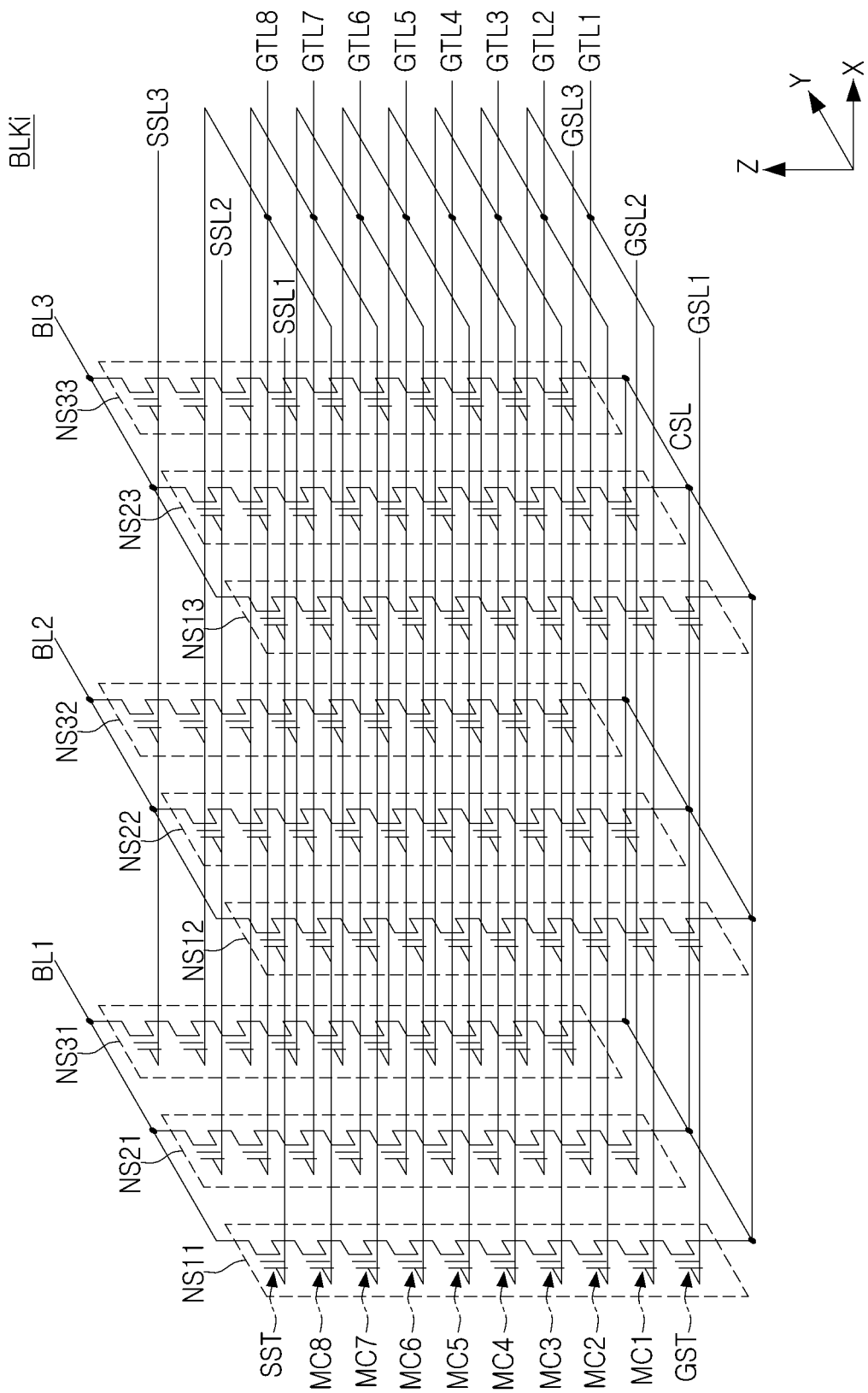
FIG. 3 is a circuit diagram of a memory block according to an example embodiment.

FIG. 3 is a circuit diagram of a memory block BLKi (where i is an integer greater than or equal to 2) according to an example embodiment. A plurality of memory NAND strings included in the memory block BLKi may be formed in a direction, perpendicular to the substrate.

Referring to FIG. 3, the memory block BLKi may include a plurality of memory NAND strings NS11 to NS33 connected between bitlines BL1, BL2, and BL3 and the common source line CSL. Each of the plurality of memory NAND strings NS11 to NS33 may include a string select transistor SST, a plurality of memory cells MC1 to MC8, and a ground select transistor GST. In FIG. 3, each of the plurality of memory NAND strings NS11 to NS33 is illustrated as including eight memory cells MC1 to MC8, but example embodiments are not limited thereto.

The string select transistor SST may be connected to corresponding string select lines SSL1, SSL2, and SSL3. The plurality of memory cells MC1 to MC8 may be connected to corresponding gate lines GTL1 to GTL8, respectively. The gate lines GTL1 to GTL8 may correspond to wordlines, and some of the gate lines GTL1 to GTL8 may correspond to dummy wordlines. The ground select transistor GST may be connected to the corresponding ground select lines GSL1, GSL2, and GSL3. The string select transistor SST may be connected to the corresponding bitlines BL1, BL2, and BL3, and the ground select transistor GST may be connected to a common source line CSL.

Wordlines (for example, WL1) having the same height may be commonly connected, and the ground selection lines GSL1, GSL2, and GSL3 and the string selection lines SSL1, SSL2, and SSL3 may be separated from each other. In FIG. 3, the memory block BLK is illustrated as being connected to eight gate lines GTL1 to GTL8 and three bitlines BL1, BL2, and BL3, but example embodiments are not limited thereto.

Figure 4:
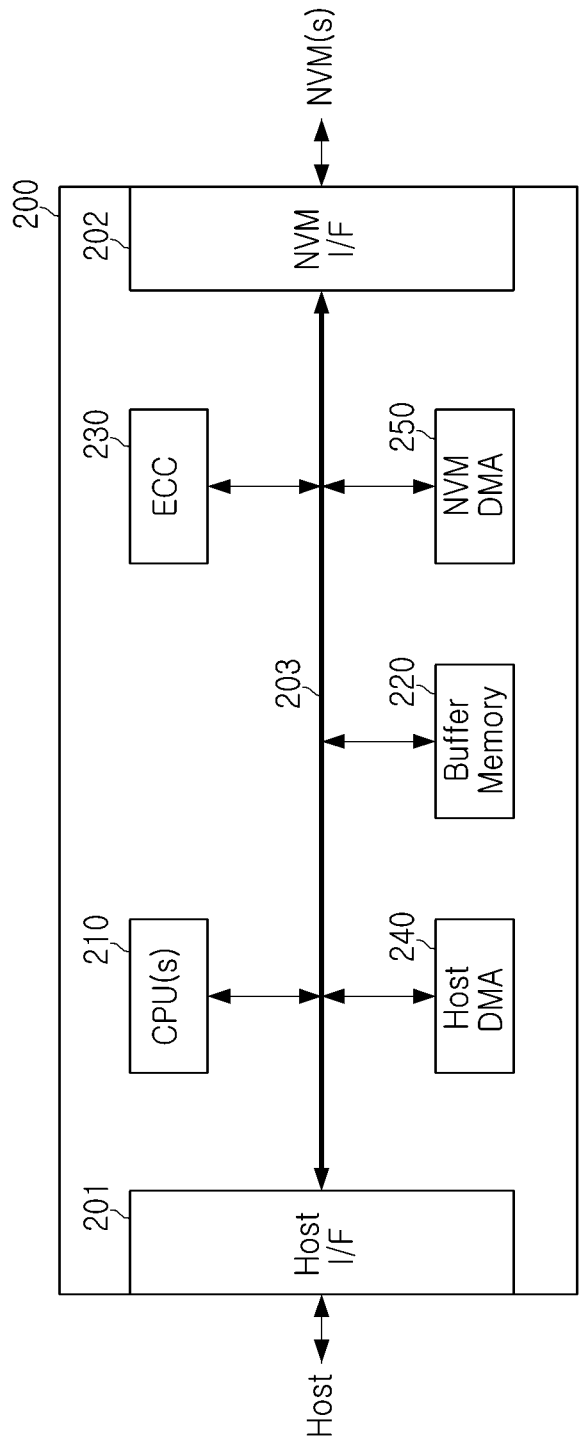
FIG. 4 is a view illustrating a controller according to an example embodiment.

FIG. 4 is a view illustrating a controller 200 according to an example embodiment. Referring to FIG. 4, the controller 200 may include a host interface circuit 201, a volatile memory interface circuit 202, a bus 203, at least one processor (CPU(s)) 210, a buffer memory 220, an error correction circuit (ECC) 230, a host DMA circuit 240, and a nonvolatile memory DMA circuit 250.

The host interface circuit 201 may be configured to transmit and receive packets to and from the host. A packet, transmitted from the host to the host interface circuit 201, may include a command or data to be written to the nonvolatile memory 100. A packet, transmitted from the host interface circuit 201 to the host, may include a response to a command or data read from the nonvolatile memory 100.

The memory interface circuit 202 may be configured to transmit data to be written to the nonvolatile memory 100 to the nonvolatile memory 100, or may be configured to receive data read from the nonvolatile memory 100. The memory interface circuit 202 may be configured to comply with standards such as JEDEC Toggle standards or ONFI standards.

The at least one processor (CPU(s)) 210 may be configured to control the overall operation of the storage device 13. The processor 210 may be configured to perform various management operations such as such as cache/buffer management, firmware management, garbage collection management, wear-leveling management, data deduplication management, read refresh/reclaim management, bad block management, multistream management, host data and nonvolatile memory mapping management, quality of service (QoS) management, system resource allocation management, nonvolatile memory queue management, read level management, erase/program management, hot/cold data management, power loss protection management, dynamic thermal management, initialization management, and/or redundant array of inexpensive disk (RAID) management. Such management operations may be implemented in hardware/firmware/software.

The processor (CPU(s)) 210 may be configured to manage the buffer area 101 (see FIG. 1) in which the second temporary data is stored, and the user area 102 (see FIG. 1) in which the data of the buffer area 101 is copied. The processor 210 may allocate and control a buffer space in which the temporary data is stored.

The buffer memory 220 may be configured to temporarily store data to be written to the nonvolatile memory device 100 or data read from the nonvolatile memory device 100. In an example embodiment, the buffer memory 220 may be an element provided in the controller 200. In another embodiment, the buffer memory 220 may be disposed outside or external to the controller 200. In addition, the buffer memory 220 may be implemented as a volatile memory (for example, a static random access memory (SRAM), a dynamic RAM (DRAM), a synchronous RAM (SDRAM), or the like), or a nonvolatile memory (for example, a flash memory, a phase-change RAM (PRAM), a magnetoresistive RAM (MRAM), a resistive RAM (Re-RAM), a ferroelectric RAM (FRAM), and/or the like).

The error correction circuit 230 may be configured to generate an error correction code (ECC) during a program operation and to recover data using the error correction code during a read operation. For example, the error correction circuit 230 may be configured to generate an error correction code (ECC) for correcting fail bits or error bits of data received from the nonvolatile memory device 100. Also, the error correction circuit 230 may be configured to perform error correction encoding of data, provided to the nonvolatile memory device 100, to generate data to which a parity bit is added. The parity bit may be stored in the nonvolatile memory device 100.

The error correction circuit 230 may be configured to perform error correction decoding on data output from the nonvolatile memory device 100. The error correction circuit 230 may be configured to correct an error using parity. The error correction circuit 230 may correct an error using a low density parity check (LDPC) code, a Bose-Chaudhuri-Hocquenghem (BCH) code, a turbo code, a Reed-Solomon code, a convolution code, a recursive systematic code (RSC), or coded modulation such as trellis-coded modulation (TCM), and/or block coded modulation (BCM). When an error is correctable in the error correction circuit 230, a read retry operation may be performed.

The packet manager may be configured to generate a packet according to a protocol of an interface negotiated with the host or may parse various pieces of information from a packet received from the host. An encryption device may be configured to perform at least one of an encryption operation and a decryption operation for data input to the controller 200 using a symmetric-key algorithm. The encryption device may encrypt and decrypt data using an advanced encryption standard (AES) algorithm. The encryption device may include an encryption module and a decryption module. In an example embodiment, the cryptographic device may be implemented in hardware/software/firmware. The encryption device may be configured to perform a self-encryption disk (SED) function or a trusted computing group (TCG) security function. The SED function may store encrypted data in the nonvolatile memory device 100, or may decrypt encrypted data from the nonvolatile memory device 100 using an encryption algorithm. Such encryption/decryption operations may be performed using an internally generated encryption key. The TCG security function may provide a mechanism enabling control of access to user data of the storage device 100. For example, the TCG security function may perform an authentication procedure between an external device and the storage device 100. In an example embodiment, the SED function or the TCG security function may be selected.

The host DMA circuit 240 may be implemented to control a DMA operation between the host device 11 and the controller 200. The host DMA circuit 240 may be configured to perform an operation of storing data, input from the host device 11 through the host interface 201, in the buffer memory 220 during a program operation under the control of a host controller. Also, the host DMA circuit 240 may be configured to perform an operation of outputting data, stored in the buffer memory 220, to the host device 11 through the host interface 201 during a read operation. In an example embodiment, the host DMA circuit 240 may be configured to be included in the host controller as a component of the host controller.

The nonvolatile memory DMA circuit 250 may be configured to control a DMA operation between the controller 200 and the nonvolatile memory device 100. The nonvolatile memory DMA circuit 250 outputs data stored in the buffer memory 220 to the nonvolatile memory device 100 through the nonvolatile memory interface circuit 202 during a program operation under the control of the nonvolatile memory controller. In addition, the nonvolatile memory DMA circuit 250 may perform an operation of reading data stored in the nonvolatile memory device 100 through the nonvolatile memory interface circuit 202 during a read operation.

The nonvolatile memory DMA circuit 250 may receive at least one data group, divided into read transfer units, from the nonvolatile memory interface circuit 202 during a read operation. The nonvolatile memory DMA circuit 250 may divide each data group into at least two data subgroups, each having a data size unit smaller than the read transfer unit. The data subgroups may be data of which an error is corrected by the error correction circuit 230. In an example embodiment, when a first read pass is selected, at least two data subgroups may be transmitted to the host DMA circuit 240. In another embodiment, when a second read pass is selected, at least two data subgroups may be sequentially transmitted to the buffer memory 220.

When the data subgroups are transmitted to the buffer memory 220, the nonvolatile memory DMA circuit 250 may output information notifying beginning of read streaming to the buffer controller. For example, the nonvolatile memory DMA circuit 250 may be configured to be included in the nonvolatile memory controller as an element of the nonvolatile memory controller.

Figure 5A:
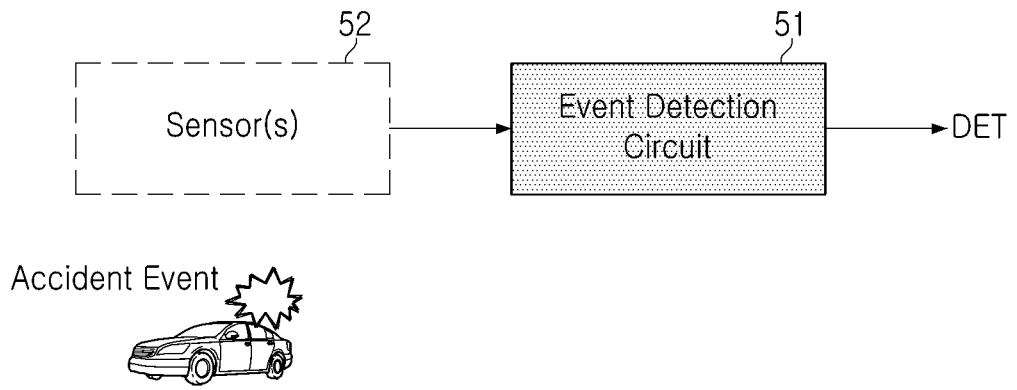
FIGS. 5A, 5B, and 5C are views illustrating an even occurrence situation.
Figure 5B:
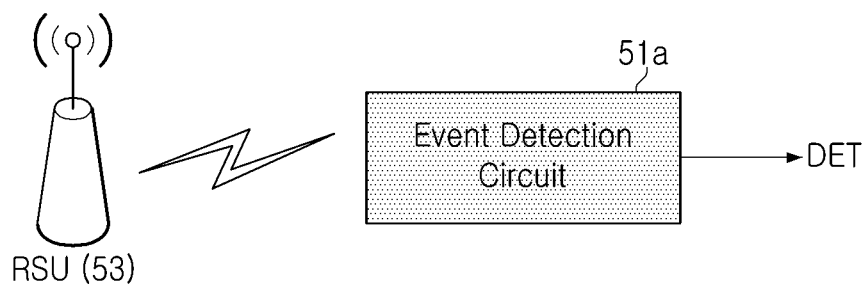
Figure 5C:
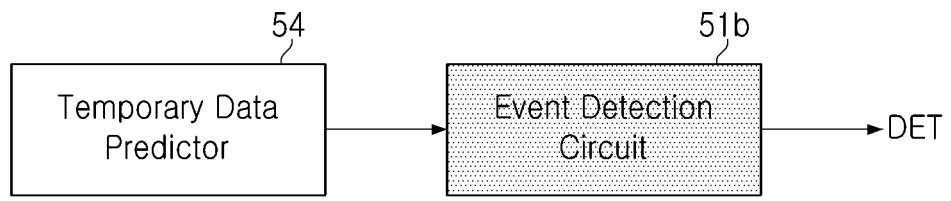

FIGS. 5A, 5B, and 5C are views illustrating an event occurrence situation.

Referring to FIG. 5A, at least one sensor 52 may be configured to detect a vehicle accident event, and may be configured to transmit detected information to an event detection circuit 51. The event detection circuit 51 may be configured to receive detected information corresponding to the vehicle accident event, and may be configured to output an event detection signal DET.

Referring to FIG. 5B, a road side unit (RSU) 53 may transmit traffic information to the host device 11 (see FIG. 1) using wireless communications. The event detection circuit 51*a* of the host device 11 may be configured to receive traffic information, and may be configured to output an event detection signal DET corresponding to the traffic information.

Referring to FIG. 5C, a temporary data predictor 54 may be configured to predict use of temporary data, and may be configured to determine whether a size of predicted temporary data is greater than a predetermined value. The event detection circuit 51*b* may output the detection signal DET based on the size of the predicted temporary data.

The buffer area 101 (see FIG. 1) and the user area 102 (see FIG. 1) according to an example embodiment may be implemented in various types of cell structure.

FIGS. 6A, 6B, 6C, and 6D are views illustrating examples of the buffer area 101 and the user area 102 according to an example embodiment.

Figure 6A:
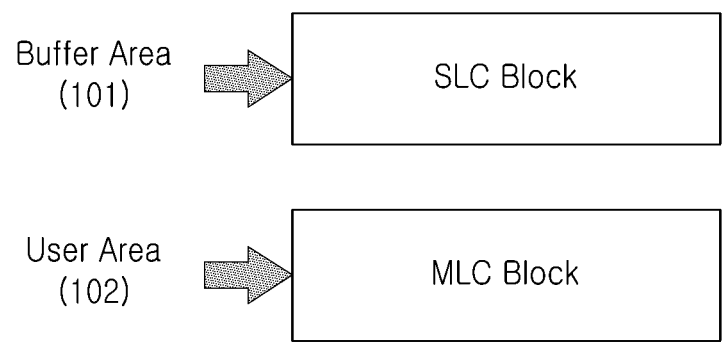
FIGS. 6A, 6B, 6C, and 6D are views illustrating examples of a buffer area and a user area according to an example embodiment.
Figure 6B:
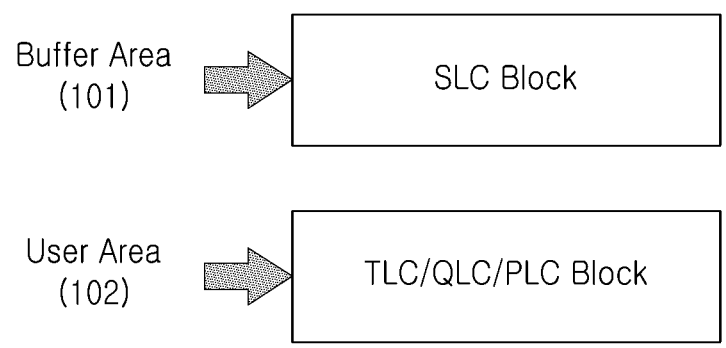
Figure 6C:
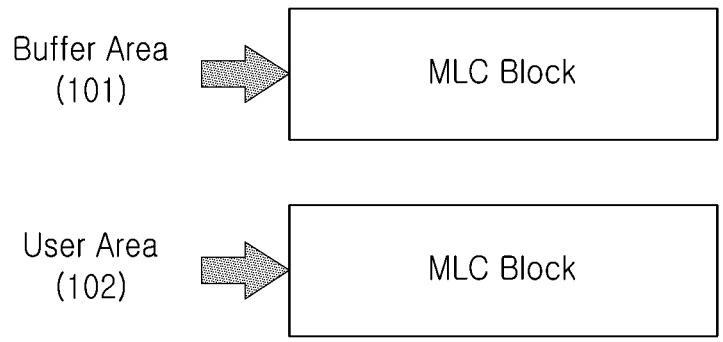
Figure 6D:
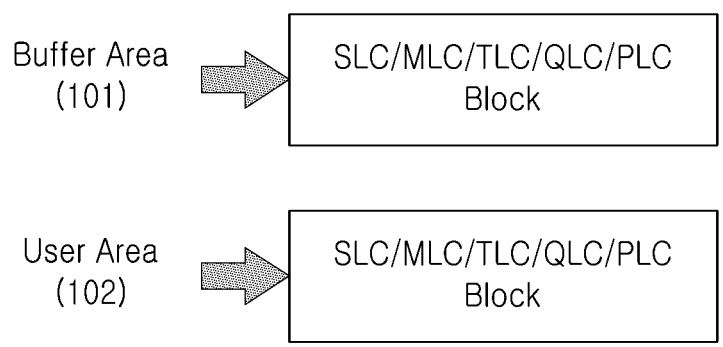

Referring to FIG. 6A, the buffer area 101 may include a single-level cell (SLC) block, and the user area 102 may include a multilevel cell (MLC) block. The SLC block may include a plurality of pages including single-level cells, and the MLC block includes a plurality of pages including multilevel cells. Referring to FIG. 6B, the buffer area 101 may include a single-level cell (SLC) block, and the user area 102 may include a triple-level cell (TLC)/quad-level cell (QLC)/penta-level cell (PLC) block. Referring to FIG. 6C, each of the buffer area 101 and the user area 102 may include a MLC block. Referring to FIG. 6D, each of the buffer area 101 and the user area 102 may include a SLC/MLC/TLC/QLC/PLC block.

However, it should be understood that the cell types of the buffer area 101 and the user area 102 according to an example embodiment are not limited to these examples. Hereinafter, for ease of description, it will be assumed that the buffer area 101 is implemented as an SLC block, and the user area 102 is implemented as an MLC block.

Figure 7A:
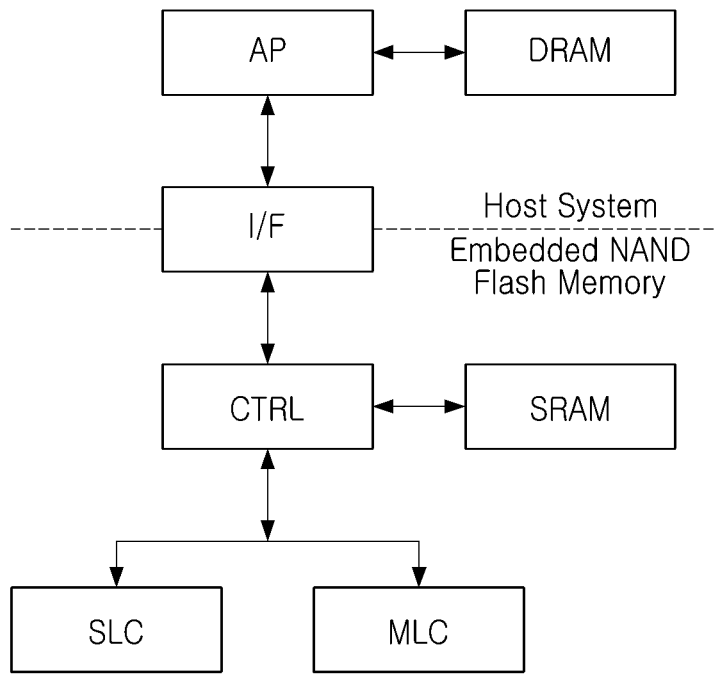
FIGS. 7A and 7B are views illustrating a storage device having a storage space, implemented as bocks having different cell types, according to an example embodiment and a method of managing the storage space.
Figure 7B:
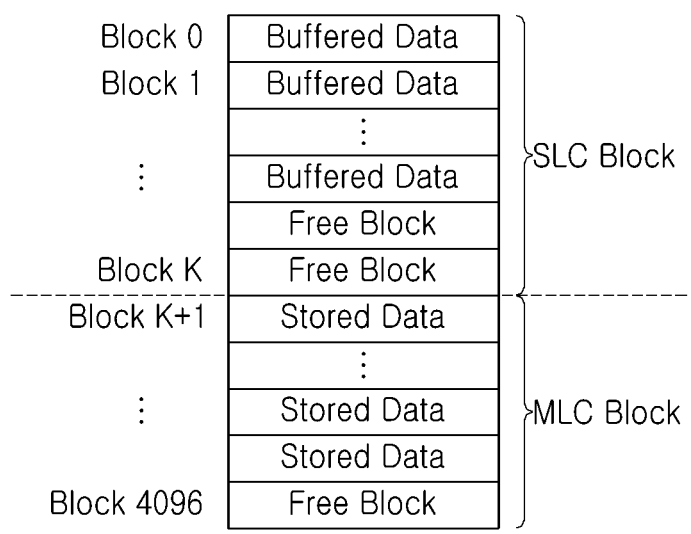

FIGS. 7A and 7B are views illustrating a storage device having a storage space implemented as blocks having different cell types and a method of managing the storage space according to an example embodiment.

The controller (CTRL, see FIG. 1) according to an example embodiment may be configured to manage a storage space in the embedded storage device (eSTRG, see FIG. 1) after dividing the storage space into a buffer area (or a SLC area) and a storage area (or a MLC area). In an example embodiment, a ratio of the two areas may be set by a user. In an example embodiment, a size of the buffer area may be determined in consideration of the amount of data generated in time units and time to be stored.

The embedded storage device (eSTRG), according to an example embodiment, may be configured to receive temporary data from the host device (AP, see FIG. 1). The controller CTRL of the embedded storage device eSTRG may be configured to store the transferred temporary data in the buffer area. When settlement data is received from the host device AP or persistent storage of data in the buffer area is determined, the controller CTRL may store data in a memory block corresponding to a logical block address LBA designated by the host device AP in the storage area.

In an example embodiment, the controller CTRL may be configured to manage memory blocks in the buffer area in a round-robin manner. For example, the controller CTRL may be configured to manage a memory block, in which oldest data is stored, and a newest memory block, in which current data is used, as a head and a tail. When the amount of temporary data received from the host device (AP) becomes larger than a size of the data buffer, the controller CTRL may erase the memory block in which the oldest data is stored, and may program new data to an erased memory block. The memory block, in which the oldest data is stored, may be a memory block in which program elapsed time is oldest.

The controller CTRL may be configured to map an LBA and a memory block in the same manner as in the general management manner to manage the storage area. A user (for example, AP) may access or control stored data through the LBA.

When there is a specific event, such as a crash accident or a user data storage request, data in the buffer area may be moved to a predetermined logical block address (LBA) or a memory block in the storage area corresponding to the requested LBA of the host device AP.

The controller CTRL may move a portion of the recent data or entire data in the buffer area to the storage area. For example, when the entire data in the buffer area needs to be moved, the controller CTRL may sequentially move data from the head to the tail of the data buffer. After such a data movement is completed, the head may be set to point to the same memory block as the tail. When only a portion of the buffer area is moved, the controller CTRL may calculate a required amount of data to sequentially move data to the storage area from a middle block to the tail block. After such a data movement is completed, the head may be set to point to the same block as the tail.

In general, because the buffer area generally requires a high storage speed, a large number erase-program operations should be guaranteed. On the other hand, because the storage area stores only data directly requested to be stored by the host device AP, only a relatively small number of erase-program operations needs to be guaranteed. Therefore, memory blocks belonging to each region may have different cell types. For example, when data characteristics for each area are taken into consideration, the buffer area may be configured as a single-level cell (SLC) and the storage area may be configured as a multilevel cell (MLC).

In addition, because data temporarily stored in the buffer area is retained for a relatively small amount of time, memory blocks constituting a corresponding area may guarantee a greater number of erase-program operations by mitigating the retention conditions.

The embedded storage device eSTRG, according to an example embodiment, may be configured to divide a storage space into two regions, and may configure the two divided regions as memory blocks having different cell types. The controller CTRL may be configured to store data by determining an area based on a data format requested to be written by the host device AP.

Figure 8A:
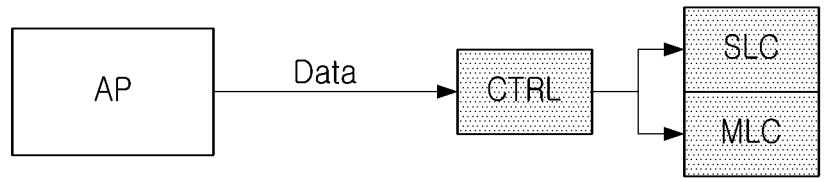
FIG. 8A is a view illustrating that a storage area is determined based on the type of data in a host system according to an example embodiment.

FIG. 8A is a view illustrating that a storage area is determined based on the type of data in a host system according to an example embodiment. Referring to FIG. 8A, the host device 11 may distinguish temporary data (the second temporary data of FIG. 1) from stored data that are required to be retained.

In an example embodiment, the host device 11 may add a separate tag for distinguishing temporary data from stored data. The controller CTRL may distinguish the temporary data from the stored data using such a tag. In an example embodiment, the temporary data may be stored in a SLC block through the controller CTRL. In an example embodiment, the storage data may be stored in a MLC block through the controller CTRL.

Figure 8B:
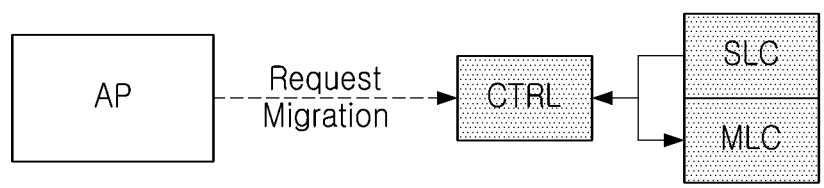
FIG. 8B is a view illustrating that temporary data is moved to a storage space in response to a request of a host device in a host system according to an example embodiment.

FIG. 8B is a view illustrating that temporary data is moved to a storage space in response to a request from a host device in the host system according to an example embodiment. Referring to FIG. 8B, temporary data may be moved (or flushed) from a SLC block to a MLC block according to a specific event or a host request. In an example embodiment, such a data movement operation may be performed via the controller CTRL. In another embodiment, such a data movement operation may be internally performed in a nonvolatile memory device NVM.

Figure 9:
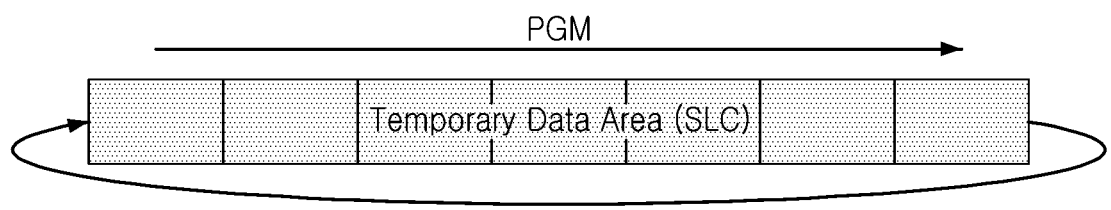
FIG. 9 is a view illustrating a method of managing a temporary data area, according to an example embodiment.

FIG. 9 is a view illustrating a method of managing a temporary data area according to an example embodiment. Referring to FIG. 9, the temporary data area may be implemented in the form of a ring buffer. The temporary data may be stored in a SLC block, and storage data may be stored in a MLC block. A size of the temporary data area may be determined by a user. For example, the size of the temporary data area may be determined in comprehensive consideration of the amount of data required for storage per second and a length of a storage period. In an example embodiment, when a temporary data area is insufficient in a storage space, latest data may be programmed after an oldest block is erased.

Figure 10A:
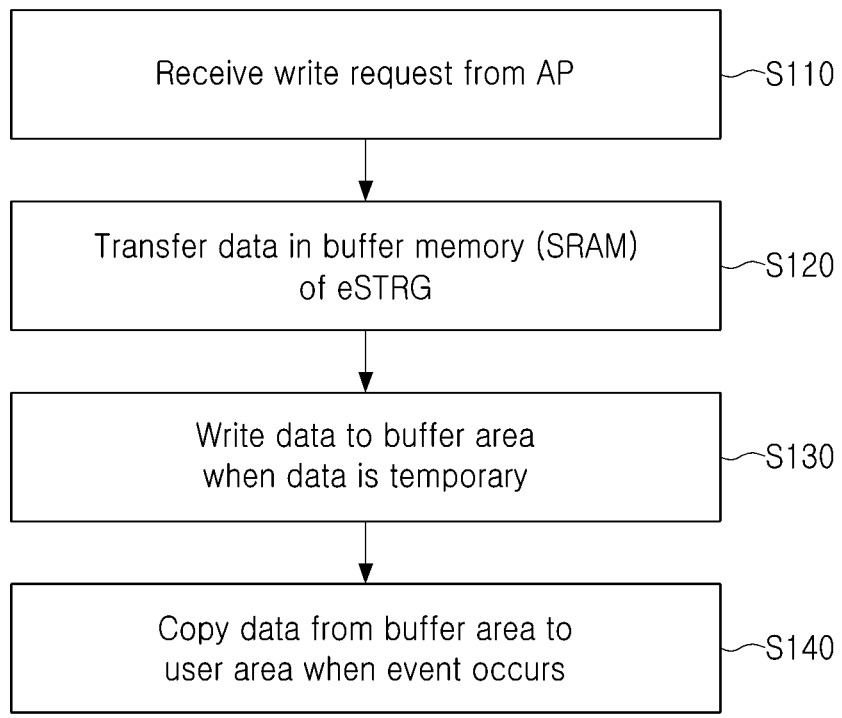
FIGS. 10A and 10B are flowcharts illustrating a method of operating a storage device according to an example embodiment.

FIG. 10A is a flowchart illustrating a method of operating a storage device eSTRG according to an example embodiment. The method of operating the storage device will be described below with reference to FIGS. 1 to 10A.

In operation S110, the storage device eSTRG (see 10 of FIG. 1) may receive data and a write request from the host device AP (see 11 of FIG. 1). In operation S120, the controller CTRL (see 200 of FIG. 1) of the storage device sSTRG may transmit write data, received from the host device AP, to the internal buffer memory (SRAM of FIG. 7A) of the storage device eSTRG. In operation S130, when the write data is temporary data, the storage device eSTRG may write the temporary data to blocks of the buffer area of the nonvolatile memory device NVM. In operation S140, when the same event occurs in the request of the host device AP or an internal scheme of the storage device eSTRG, the storage device eSTRG may copy the temporary data from the buffer area to the user area.

In an example embodiment, the buffer area may include first memory blocks implemented as a single-level cell (SLC), and the user area may include second memory blocks implemented as a multilevel cell (MLC), a triple-level cell (TLC), a quad-level cell (QLC), or a penta-level cell (PLC). In an example embodiment, temporary data may be programmed to a corresponding memory block, among the first memory blocks, in a round-robin manner. In an example embodiment, temporary data may be read from the buffer area, an error of the read temporary data may be corrected, and the error-corrected data may be programmed to a corresponding memory block, among the second memory blocks. In an example embodiment, event-related information may be received from the host device AP.

The write request may include tag information indicating the type of data. The storage device eSTRG according to an example embodiment may determine whether data is temporary data, using the tag information, and may store the temporary data in the buffer area based on a determination result.

Figure 10B:
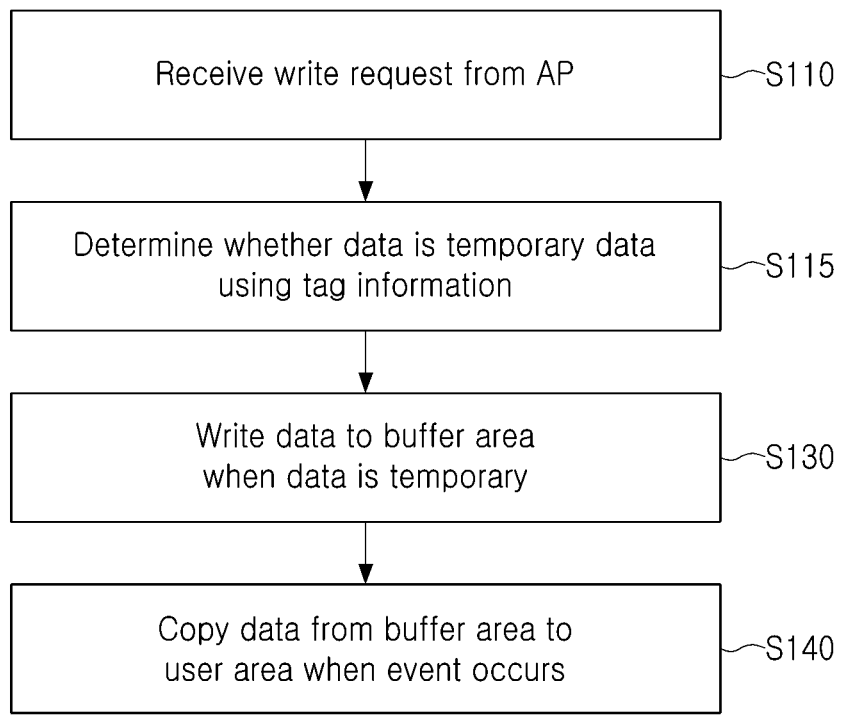

FIG. 10B is a flowchart illustrating a method of operating a storage device eSTRG according to another example embodiment. The method of operation the storage device will be described below with reference to FIGS. 1 to 10B.

In operation S110, the storage device eSTRG may receive data and a write request from the host device AP. In operation S115, the controller CTRL of the storage device eSTRG may determine whether to write data to blocks of the buffer area or blocks of the user area using the tag information received from the host device AP. In operation S130, when the tag information included in the write request indicates temporary data, the controller CTRL may write the temporary data to blocks in the buffer area of the nonvolatile memory device NVM. In operation S140, when the same event occurs in the request of the host device AP or the internal scheme of the storage device eSTRG, the storage device eSTRG may copy the temporary data from the buffer area to the user area.

Figure 11:
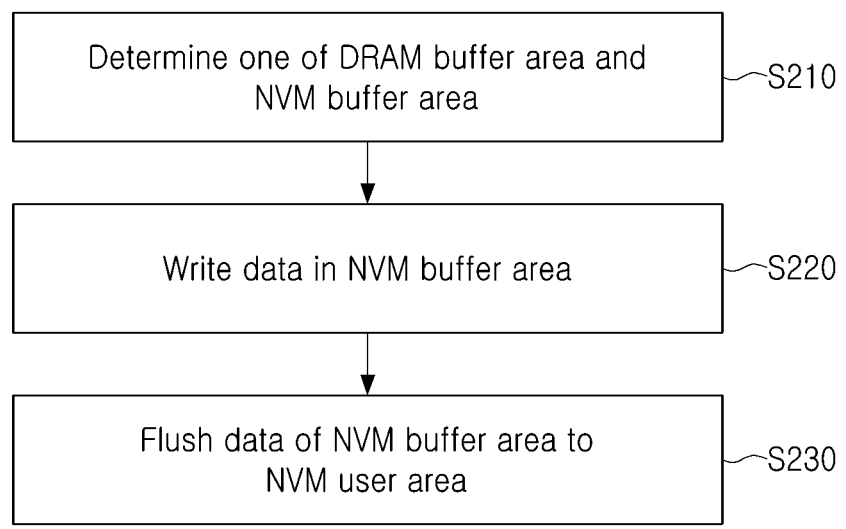
FIG. 11 is a flowchart illustrating a method of operating a host device according to an example embodiment.

FIG. 11 is a flowchart illustrating a method of operating a host device according to an example embodiment. Referring to FIGS. 1 to 11, the host device AP may operate, as follows.

In operation S210, the host device AP may determine one of the DRAM buffer area and the NVM buffer area as a space in which temporary data is to be stored. For example, when the size of the temporary data is larger than a predetermined data size, the host device AP may write the temporary data to the NVM buffer area. The host device AP may write the temporary data to the NVM buffer area based on the type of data. In operation S220, for example, when the temporary data indicates media data, the host device AP may write the temporary data to the NVM buffer area. Meanwhile, when the temporary data is not media data, the host device AP may write the temporary data to the DRAM buffer area. In another embodiment, when a predetermined event occurs, the host device AP may write temporary data to the NVM buffer area. In operation S230, the host device AP may flush the temporary data, stored in the NVM buffer area, to the NVM user area.

In an example embodiment, the host device AP may include a controller for autonomous driving. In an example embodiment, the NVM buffer area and the NVM user area may be included in an embedded storage device (eSTRG, see FIG. 1). In an example embodiment, the host device AP may transmit a flush request to the embedded storage device eSTRG. In an example embodiment, after the temporary data is copied to the NVM user area, a completion message of the flushing operation may be received from the embedded storage device eSTRG.

The temporary data, received from the host device AP, may be stored in a block allocated for a buffer. The controller CTRL of the storage device eSTRG may store data by allocating blocks of the buffer area in a round-robin manner. Then, when a specific event is triggered, the data stored in the buffer block may be moved to the storage block to be retained. A system storing data for a predetermined period of time due to a specific event, such as an event data recorder (EDR) or an accident data recorder (ADR), may temporarily store data in a volatile memory before an event occurs. The volatile memory may be a DRAM. A role in buffering data may be brought into a proposed flash memory device, resulting in a decrease in the size of the DRAM or an increase in the amount of data which may be retained before being stored.

In general, autonomous driving requires a large amount of data, such as image information and sensor information. Because such data is stored when an event, such as a crash accident, occurs, the data should be retained in a DRAM for a predetermined period of time. To this end, in a conventional system, capacity of a DRAM should be decreased. However, in example embodiments, data may be temporarily stored and persistently retained with only a flash memory device providing relatively low cost and relatively high capacity without increasing capacity of a DRAM.

According to example embodiments, the host device AP may transmit data after distinguishing a format of the data, so that the controller CTRL of the flash memory device may select a block of a nonvolatile memory according to internal rules to write data. Because an access to temporary data stored in a buffer area through a logical block address (LBA) may not be possible, the host device AP is allowed to only have restricted access or control. Accordingly, buffer blocks may guarantee short data retention to obtain a greater number of erase-program operations, so that undesirable issues may be avoided when the host device AP accesses damaged data. In addition, operations such as garbage collection or wear-leveling for a corresponding area may be excluded to guarantee high-speed write performance and low write amplification index (WAI) for the buffer area.

Figure 12:
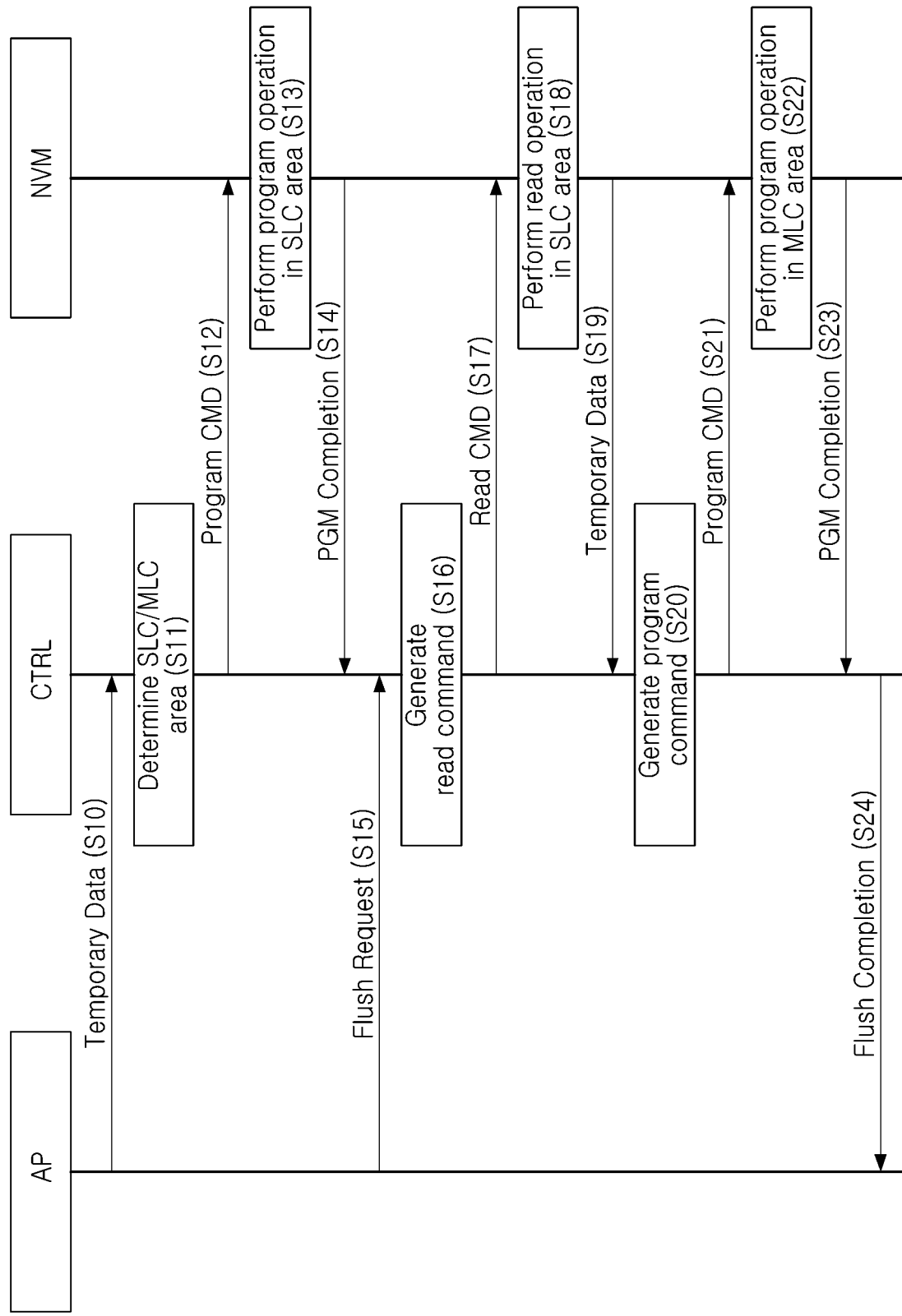
FIG. 12 is a ladder diagram illustrating a method of operating a host system according to an example embodiment.

FIG. 12 is a ladder diagram illustrating a method of operating a host system according to an example embodiment. Referring to FIG. 12, the host system may operate as follows.

In operation S10, the host device AP may transmit temporary data to the controller CTRL of the storage device eSTRG. In operation S11, the controller CTRL may receive the temporary data and may determine one of the SLC area and the MLC area as an area in which the temporary data is to be stored. In operation S12, the controller CTRL may transmit the temporary data and a program command to the nonvolatile memory device NVM to store data in the SLC area. In operation S13, the nonvolatile memory device NVM may perform a program operation to store the temporary data in the SLC area in response to a program command. In operation S14, the nonvolatile memory device NVM may output completion information of a program operation to the controller CTRL.

In operation S15, the host device AP may transmit a flush request for the temporary data in the SLC area to the controller CTRL. In operation S16, the controller CTRL may receive the flush request and may generate a read command for reading read data stored in the SLC area. In operation S17, the controller CTRL may transmit the read command to the nonvolatile memory device NVM. In operation S18, the nonvolatile memory device NVM may perform a read operation on the SLC area in response to the read command.

In operation S19, the nonvolatile memory device NVM may transmit temporary data according to the read request to the controller CTRL. In operation S20, the controller CTRL may perform an error correction operation on the temporary data and may generate a program command for programming the error-corrected data to the MLC area. In operation S21, the controller CTRL may transmit the error-corrected data and a program command to the nonvolatile memory device NVM. In operation S22, the nonvolatile memory device NVM may perform a program operation to program the error-corrected data to the MLC area in response to the program command. In operation S23, the nonvolatile memory device NVM may output completion information of the program operation to the controller CTRL. In operation S24, the controller CTRL may receive the completion information of the program operation and may transmit a completion message of a flush request to the host device AP.

The memory device according to example embodiments may be applied to a computing device.

Figure 13:
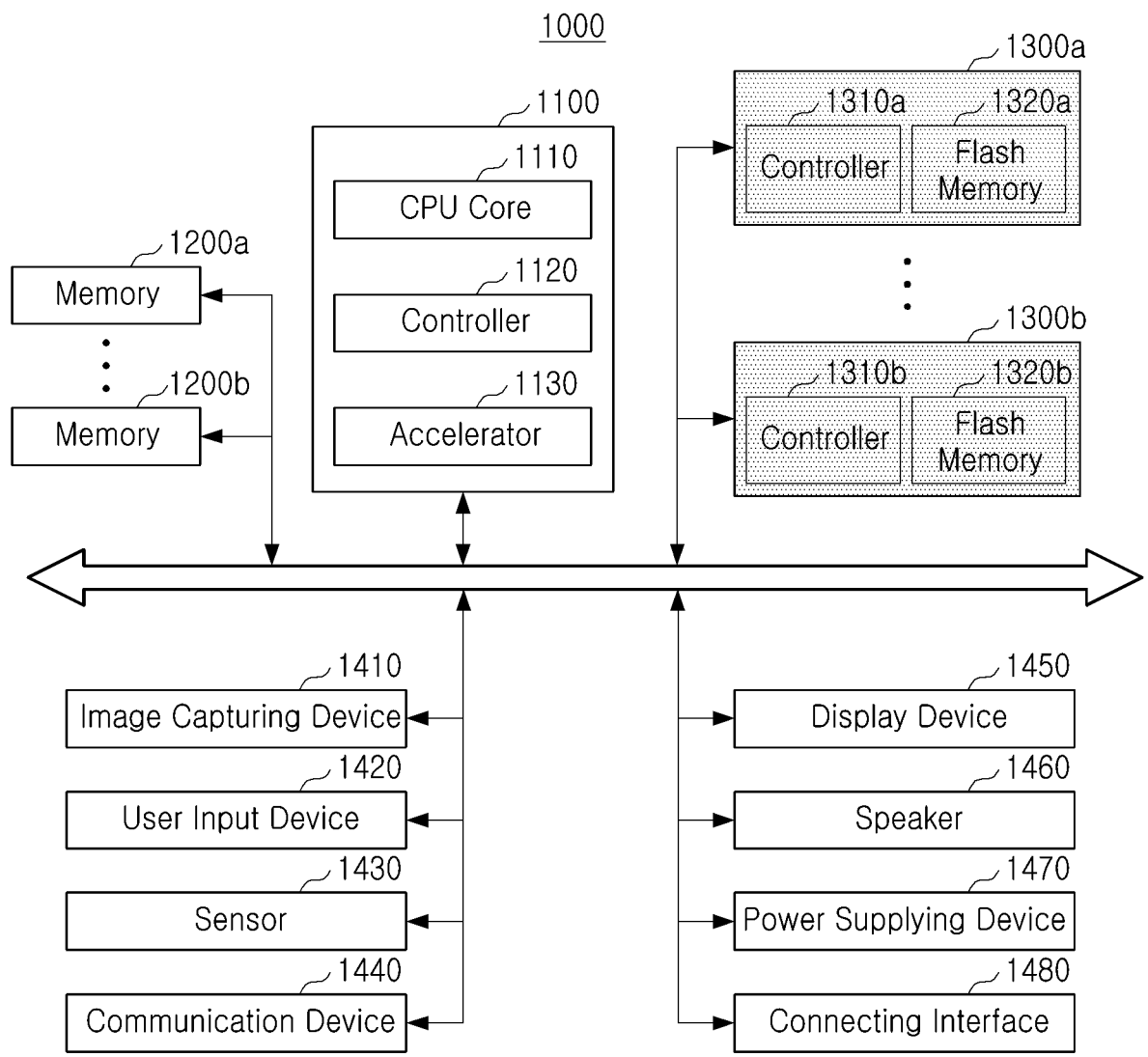
FIG. 13 is a view illustrating a computing system according to an example embodiment.

FIG. 13 is a view illustrating a computing system 1000 according to an example embodiment. Referring to FIG. 13, the computing system 1000 may include a main processor 1100, memories 1200a and 1200b, and storage devices 1300a and 1300b, and may further include an image capturing device 1410, a user input device 1420, a sensor 1430, a communicating device 1440, a display device 1450, a speaker 1460, a power supplying device 1470, and a connecting interface 1480.

The main processor 1100 may be configured to control the overall operation of the computing system 1000. For example, the main processor 1100 may be configured to control operations of other elements constituting the computing system 1000. The main processor 1100 may be implemented as, for example, a general-purpose process or, a specific-purpose processor, or an application processor.

The main processor 1100 may include one or more central processing unit (CPU) cores 1110 and may further include a controller 1120 for controlling the memories 1020a and 1200b or the storage devices 1300a and 1300b. In example embodiments, the main processor 1100 may further include an accelerator block 1130, a specific-purpose circuit for a high-speed data operation such as an artificial intelligence (AI) data operation. The accelerator block 1130 may include a graphics processing unit (GPU), a neural processing unit (NPU), a data processing unit (DPU), and/or the like, and may be implemented as an additional chip, physically independent from other elements of the main processor 1100.

The memories 1200a and 1200b may be used as the main memory device of the system 1000, and may include volatile memories such as an SRAM and/or a DRAM but may also include a nonvolatile memory such as a flash memory, a PRAM and/or an RRAM. The memories 1200a and 1200b may be implemented in the same package as the main processor 1100.

The storage devices 1300a and 1300b may be configured to function as nonvolatile storage devices storing data irrespective of whether power is supplied or not, and may have relatively high storage capacity, as compared with the memories 1200a and 1200b. The storage devices 1300a and 1300b may include storage controllers 1310a and 1310b and nonvolatile memories (NVMs) 1320a and 1320b configured to store data under the control of the storage controllers 1310a and 1310b. The NVMs 1320a and 1320b may include V-NAND flash memories having a two-dimensional (2D) or three-dimensional (3D) structure but may include other types of nonvolatile memory such as PRAMs or RRAMs.

The storage devices 1300a and 1300b may be included in the system 1000 in a state of being physically separated from the main processor 1100 or may be implemented in the same package as the main processor 1100. In addition, the storage devices 1300a and 1300b may have the same shape as a solid state drive (SSD) or a memory card and may be removably coupled to other elements of the system 1000 through an interface, such as the connecting interface 2480 to be described below. The storage devices 1300a and 1300b may be devices to which a standard protocol, such as a universal flash storage (UFS), an embedded multimedia card (eMMC), and/or NVM express (NVMe) is applied, but example embodiments are not limited thereto.

The image capturing device 1410 may be configured to capture a still image or a video, and may be a camera, a camcorder, a webcam, or the like.

The user input device 1420 may be configured to receive various types of data input from a user of the computing system 1000, and may be a touchpad, a keypad, a keyboard, a mouse, a microphone, or the like.

The sensor 1430 may be configured to detect various types of physical quantity, which may be obtained from an external entity of the computing system 1000, and may convert the detected physical quantity into an electrical signal. The sensor 1430 may be a temperature sensor, a pressure sensor, an illuminance sensor, a position sensor, an acceleration sensor, a biosensor, or a gyroscope.

The communicating device 1440 may be configured to transmit/receive signals to/from other devices outside the system 1000 according to various communication protocols. The communicating device 1440 may be implemented including an antenna, a transceiver, a modem, and the like. The display device 1450 and the speaker 1460 may function as output devices, respectively outputting visual information and audio information to the user of the computing system 1000. The power supply device 1470 may appropriately convert power, supplied from a battery embedded in the computing system 1000, or an external power supply and may supply the converted power to each element of the computing system 1000.

The connecting interface 1480 may be configured to provide a connection between the computing system 1000 and an external device connected to the computing system 1000 and capable of exchanging data with the system 1000. The connecting interface 1480 may be implemented in various interface methods such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, universal serial bus (USB), a secure digital (SD) card, multi-media card (MMC), embedded MMC (eMMC), UFS, embedded UFS (eUFS), and/or a compact flash (CF) card interface.

Example embodiments may be applied to a universal flash storage (UFS) system.

Figure 14:
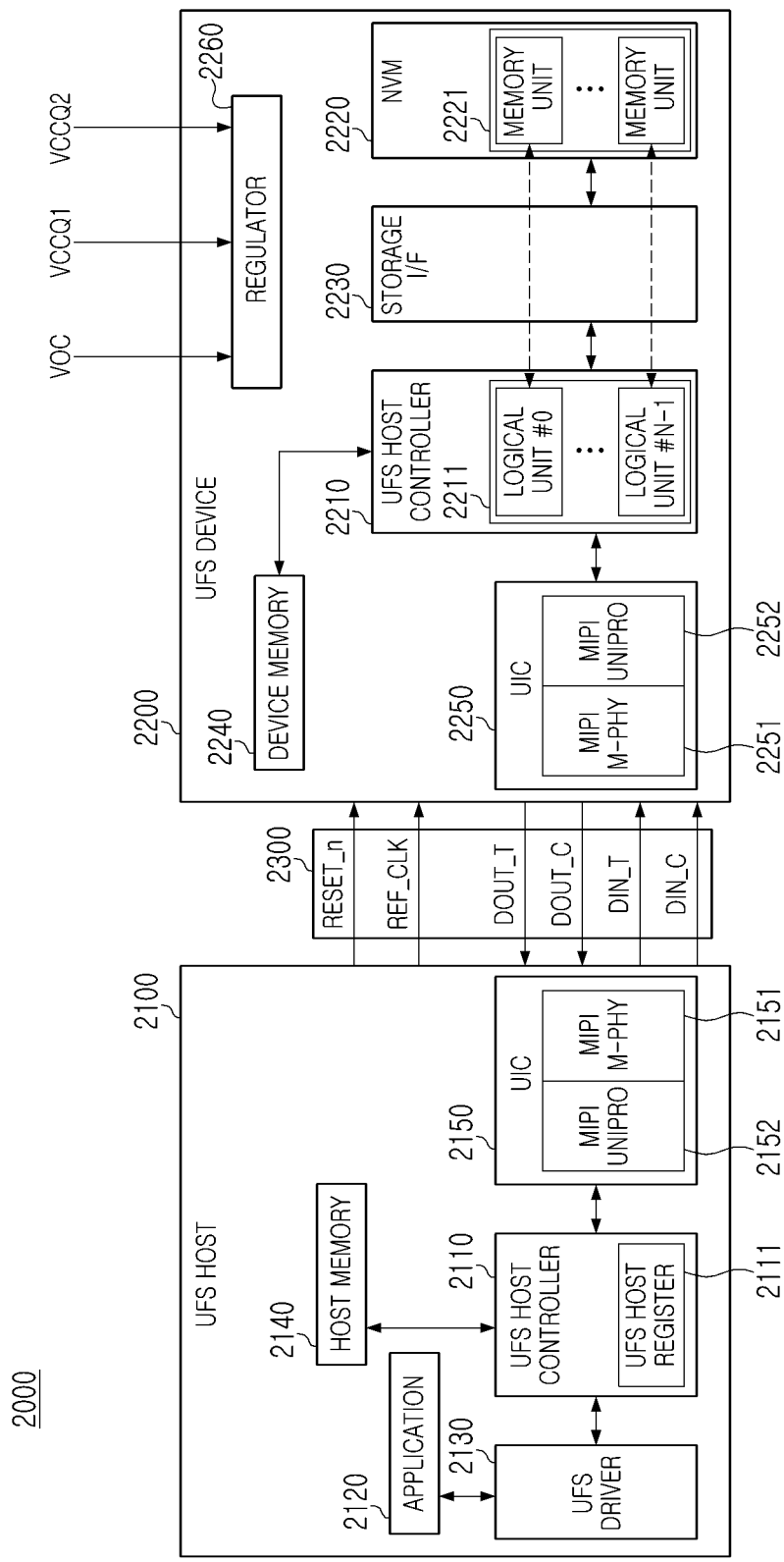
FIG. 14 is a view illustrating a UFS system according to an example embodiment.

FIG. 14 is a view illustrating a UFS system 2000 according to an example embodiment. The UFS system 2000 may include a UFS host 2100, a UFS device 2200, and a UFS interface 2300. The description of the host system 10 described with reference to FIGS. 1 to 13 may be applied to the UFS system 2000 of FIG. 14. Referring to FIG. 14, a UFS host 2100 and a UFS device 2200 may be connected to each other through a UFS interface 2300.

The UFS host 2100 may include a UFS host controller 2110, an application 2120, a UFS driver 2130, a host memory 2140, and a UFS interconnect (UIC) layer 2150. The UFS device 2200 may include a UFS device controller 2210, a nonvolatile memory 2220, a storage interface 2230, a device memory 2240, a UIC layer 2250, and a regulator 2260. The nonvolatile memory 2220 may include a plurality of memory units 2221, and the memory unit 2221 may include a V-NAND flash memory having a 2D structure or a 3D structure, but may include another type of nonvolatile memory such as a PRAM or an RRAM. The UFS device controller 2210 and the nonvolatile memory 2220 may be connected to each other through the storage interface 2230. The storage interface 2230 may be implemented to comply with standards such as Toggle standards or ONFI standards.

The application 2120 may refer to a program for communicating with the UFS device 2200 to use a function of the UFS device 2200. The application 2120 may be configured to transmit an input-output request (IOR) for input/output of the UFS device 2200 to the UFS driver 2130. The IOR may include a data read request, a data write request, and/or a data discard request, but example embodiments are not limited thereto.

The UFS driver 2130 may be configured to manage the UFS host controller 2110 through a UFS-host controller interface (HCI). The UFS driver 2130 may convert an IOR, generated by the application 2120, into a UFS command defined by a UFS standard and may transmit the UFS command to the UFS host controller 2110. A single IOR may be converted into a plurality of UFS commands. A UFS command may basically be a command defined by the SCSI standard, but may also be an exclusive command for the UFS standard.

The UFS host controller 2110 may be configured to transmit a UFS command, provided by the UFS driver 2130, to the UIC layer 2250 of the UFS device 2200 via the UIC layer 2150 and the UFS interface 2300. In this process, a UFS host register 2111 of the UFS host controller 2110 may function as a command queue (CQ). The UIC layer 2150 of the UFS host 2100 may include a MIPI M-PHY 2151 and a MIPI UniPro 2152, and the UIC layer 2250 of the UFS device 2200 may include a MIPI M-PHY 2251 and a MIPI UniPro 2252.

The UFS interface 2300 may include a line for transmitting a reference clock signal REF_CLK, a line for transmitting a hardware reset signal RESET_n with respect to the UFS device 2200, a pair of lines for transmitting a differential input signal pair DIN_T and DIN_C, and a pair of lines for transmitting a differential output signal pair DOUT_T and DOUT_C.

A frequency value of the reference clock signal REF_CLK provided from the UFS host 2100 to the UFS device 2200 may be, but is not limited to, one of 19.2 MHz, 26 MHz, 338.4 MHz, and 52 MHz. Even while the UFS host 2100 operates, for example, even while data transmission and reception between the UFS host 2100 and the UFS device 2200 is performed, a frequency value of the reference clock signal REF_CLK may be changed. The UFS device 2200 may be configured to generate clock signals having various frequencies from the reference clock signal REF_CLK, received from the UFS host 2100, using a phase-locked loop (PLL) or the like. In addition, the UFS host 2100 may also set a value of a data rate between the UFS host 2100 and the UFS device 2200, based on the frequency value of the reference clock signal REF_CLK. For example, the value of the data rate may be determined based on the frequency value of the reference clock signal REF_CLK.

The UFS interface 2300 may be configured to support a plurality of lanes, and each lane may be implemented by a differential pair. For example, a UFS interface may include one or more reception lanes and one or more transmission lanes. In FIG. 14, the pair of lines for transmitting the differential input signal pair DIN_T and DIN_C may constitute a reception lane, and the pair of lines for transmitting the differential output signal pair DOUT_T and DOUT_C may constitute a transmission lane. Although one transmission lane and one reception lane are illustrated in FIG. 14, the number of the transmission lanes and the number of the reception lanes may be changed.

The reception lane and the transmission lane may be configured to transfer data in a serial communication manner, and full-duplex type communication between the UFS host 2100 and the UFS device 2200 may be allowed due to a structure in which the reception lane is separated from the transmission lane. For example, even while receiving data from the UFS host 2100 through the reception lane, the UFS device 2200 may be configured to transmit data to the UFS host 2100 through the transmission lane. In addition, control data, such as a command from the UFS host 2100 to the UFS device 2200, and user data that the UFS host 2100 intends to store in the NVM storage 2220 of the UFS device 2200 or to read from the NVM storage 2220 may be transmitted through the same lane. Accordingly, there is no need to provide an additional lane for data transmission between the UFS host 2100 and the UFS device 2200, in addition to a pair of reception lanes and a pair of transmission lanes.

The UFS device controller 2210 of the UFS device 2200 may control the overall operation of the UFS device 2200. The UFS device controller 2210 may manage the NVM storage 2220 through a logical unit (LU) 2211, a logical data storage unit. The number of LUs 2211 may be, but is not limited to, eight (8). The UFS device controller 2210 may include a flash translation layer (FTL) and may convert a logical data address, for example, a logical block address (LBA), transferred from the UFS host 2100, into a physical data address, for example, a physical block address (PBA) using address mapping information of the FTL. In the UFS system 2000, a logical block for storing user data may have a size in a certain range. For example, a minimum size of the logical block may be set to be 4 Kbyte. However, it should be understood that the size of the logical block is not limited thereto.

When a command from the UFS host 2100 is input to the UFS device 2200 through the UIC layer 2250, the UFS device controller 2210 may be configured to perform an operation according to the input command, and when the operation is completed, the UFS device controller 2210 may be configured to transmit a completion response to the UFS host 2100.

In an example embodiment, when the UFS host 2100 intends to store user data in the UFS device 2200, the UFS host 2100 may transmit a data storage command to the UFS device 2200. When a response indicative of being ready to receive the user data is received from the UFS device 2200, the UFS host 2100 may be configured to transmit the user data to the UFS device 2200. The UFS device controller 2210 may be configured to temporarily store the received user data in the device memory 2240, and may be configured to store the user data temporarily stored in the device memory 2240 in a selected location of the NVM storage 2220 based on the address mapping information of the FTL.

In an example embodiment, when the UFS host 2100 intends to read the user data stored in the UFS device 2200, the UFS host 2100 may be configured to transmit a data read command to the UFS device 2200. The UFS device controller 2210 receiving the command may be configured to read the user data from the NVM storage 2220, based on the data read command, and may temporarily store the read user data in the device memory 2240. In this data read process, the UFS device controller 2210 may detect and correct an error in the read user data using an embedded error correction code (ECC) engine.

For example, the ECC engine may be configured to generate parity bits for write data to be written to the nonvolatile memory 2220, and the generated parity bits may be stored in the nonvolatile memory 2220 together with the write data. When reading data from the nonvolatile memory 2220, the ECC engine may be configured to correct an error in the read data using the parity bits read from the nonvolatile memory 2220 together with the read data and may be configured to output the error-corrected read data.

In addition, the UFS device controller 2210 may be configured to transmit the user data, temporarily stored in the device memory 2240, to the UFS host 2100. The UFS device controller 2210 may further include an advanced encryption standard (AES) engine. The AES engine may be configured to encrypt or decrypt data, input to the UFS device controller 2210, using a symmetric-key algorithm.

The UFS host 2100 may be configured to store commands, which is to be transmitted to the UFS device 2200, in the UFS host register 2111 capable of functioning as a command queue according to an order, and may be configured to transmit the commands to the UFS device 2200 in the order. In this case, even when a previously transmitted command is still being processed by the UFS device 2200, for example, even before the UFS host 2100 receives a notification indicating that processing of the previously transmitted command is completed by the UFS device 2200, the UFS host 2100 may transmit a next command on standby in the command queue to the UFS device 2200. Thus, the UFS device 2200 may also receive the next command from the UFS host 2100 even while processing the previously transmitted command. A queue depth of commands, which may be stored in the command queue, may be, for example, 332. In addition, the command queue may be implemented using a circular queue type in which a start and an end of a command sequence stored in a queue are respectively indicated by a head pointer and a tail pointer.

Each of the plurality of storage units 2221 may include a memory cell array and a control circuit for controlling an operation of the memory cell array. The memory cell array may include a two-dimensional memory cell array or a three-dimensional memory cell array. The memory cell array may include a plurality of memory cells. Each of the memory cells may be a single-level cell (SLC) storing one bit of data, or may be a cell storing two or more bits of data, such as a multilevel cell (MLC), a triple-level cell (TLC), a quadruple-level cell (QLC), and/or a penta-level cell (PLC).

As a power supply voltage, VCC, VCCQ1, VCCQ2, or the like, may be input to the UFS device 2200. VCC, a main power supply voltage for the UFS device 2200, may have a value of 2.4 volts to 3.6 volts. VCCQ1, a power supply voltage for supplying a voltage in a low-voltage range, may be mainly input for the UFS device controller 2210 and may have a value of 1.14 volts to 1.26 volts. VCCQ2, a power supply voltage for supplying a voltage in a range higher than VCCQ1 and lower than VCC, may be mainly input for an input-output interface such as the MIPI M-PHY 2251 and may have a value of 1.7 volts to 1.95 volts. The above-described power supply voltages may be supplied for the respective elements of the UFS device 2200 through the regulator 2260. The regulator 2260 may be implemented by a set of unit regulators, respectively connected to different power supply voltages, among the above-described power supply voltages.

Example Embodiments May be Applied to a Memory Module.

Figure 15:
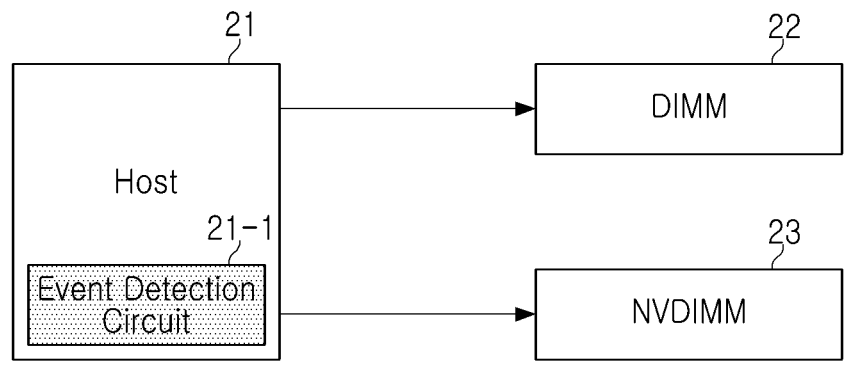
FIG. 15 is a view illustrating a host system according to another example embodiment.

FIG. 15 is a view illustrating a host system 20 according to another example embodiment. Referring to FIG. 15, the host system 20 may include a host device 21, a volatile memory module (a dual in-line memory module (DIMM)) 22, and a nonvolatile memory module (a nonvolatile dual in-line memory module (NVDIMM)) 23.

The host device 21 may include an event detection circuit 21-1 configured to detect an event. One of the DIMM 22 and the NVDIMM 23 may be determined as a temporary data storage space according to event detection of the event detection circuit 21-2. The host device 21 may be configured to selectively manage an operation mode of the NVDIMM 23 as one of a buffer mode and a storage mode. The buffer mode may be an operation mode in which temporary data is stored, and the storage mode is an operation mode in which user data is stored.

The host device 21 may include a central processing unit (CPU), a co-processor, an arithmetic processing unit (APU), a graphics processing unit (GPU), a digital signal processor (DSP), a memory controller hub (MCH), and/or the like. The host 21 may include a memory management unit (MMU) configured to manage the DIMM 22 and the NVDIMM 23.

The DIMM 22 may be configured to transmit and receive data to and from the host device 21 through a double data rate (DDR) interface. The DIMM 22 may include at least one dynamic random access memory (DRAM). The DIMM 22 may include a memory allocation area. The memory allocation area may be an area accessible by an application of the host device 21.

The NVDIMM 23 may be configured to transmit and receive data to and from the host device 21 through the DDR interface. The NVDIMM 23 may include at least one nonvolatile memory (NVM). The NVDIMM 23 may include a buffer memory accessible by an application of the host device 21, and may store a map table for managing the NVDIMM 23.

Figure 16:
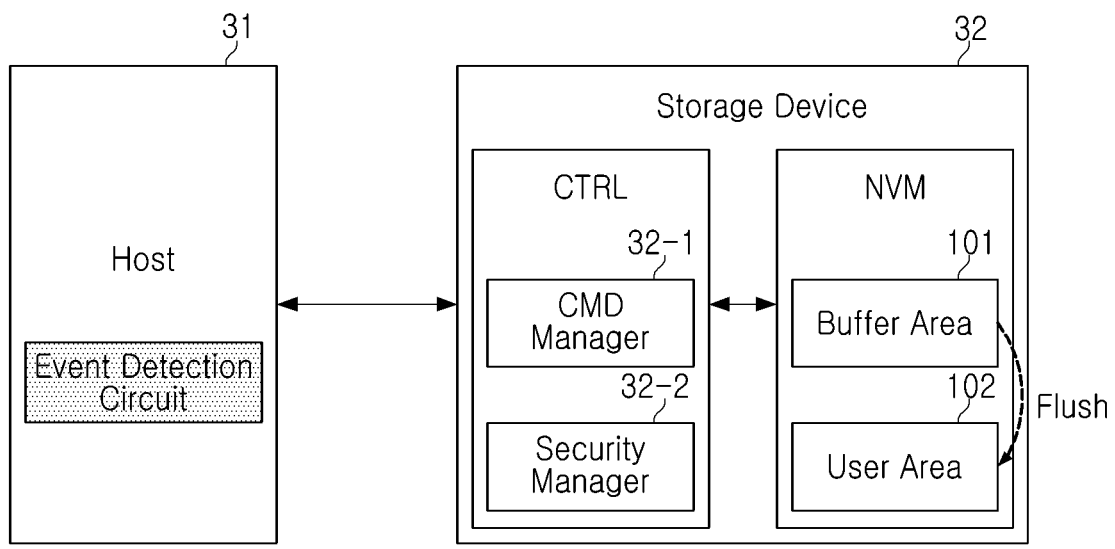
FIG. 16 is a view illustrating a host system according to another example embodiment.

FIG. 16 is a view illustrating a host system 30 according to another example embodiment. Referring to FIG. 16, the host system 30 may include a host device 31 and a storage device 32.

As illustrated in FIG. 16, the storage device 32 may include a command manager 32-1 and a security manager 32-2.

The command manager 32-1 may be configured to analyze a command provided from the host device 31, and may be configured to authenticate the input command using the security manager 32-2.

The security manager 32-2 may be configured to manage a write protect (WP) descriptor. The WP descriptor may be stored in a nonvolatile memory, such as a flash memory or a ROM. The WP descriptor may be uploaded to a volatile memory, such as a DRAM or an SRAM during power-on. The WP descriptor may be used to set or release write protection, or to change write protection properties. The WP Descriptor may include partition ID (PID), start LBA, length, writable, and type. The partition ID (PID) is provided to identify a partition to which write protection is to be applied. The start LBA refers to a start address of a logical block to which write protection is to be applied. The length refers to a length to which write protection is to be applied. Details of the WP descriptor are disclosed in U.S. Pat. No. 10,783,090, which is hereby incorporated by reference in its entity.

As described with reference to FIGS. 1 to 15, the storage device 32 may include a buffer area, in which temporary data is stored, and a user area in which the data the buffer area is flushed. In an example embodiment, in response to event detection of the host device 31, the storage device 32 may change data properties to be write-protected when a flush operation to the user area is performed. The host device 31 may provide a request for setting and releasing write protection to the storage device 32. The storage device 32 may receive a request from the host 31 and may output a response according to the request.

A buffer area, in which temporary data may be written, may be allocated in the flash memory device to store data. As necessary, the data may be moved to a storage area to be retained. A configuration is SRAM (DRAM)-controller-NAND flash memory, and the controller may be configured to independently manage an area in which temporary data and stored data are written to the NAND Flash memory. When a data buffering role of the DRAM is brought into the NAND flash memory, a larger amount of data may be temporarily stored using a flash memory having relatively high capacity and low costs. In addition, because data in a data buffer area is retained for a relatively small amount of time, a NAND block allocated to a corresponding area may guarantee a relatively great number of erase-program operations. Further, the flash memory device may be improved optimized by applying different mapping methods, or the like, according to purposes of the respective areas.

In an embedded storage device according to an example embodiment, a host system including the same, and a method operating the same, retention of temporary data may be improved or optimized by allocating a nonvolatile memory device to a buffer space when a specific event occurs. Moreover, in the embedded storage device according to an example embodiment, the host system including the same, and the method operating the same, a large amount of temporary data may be economically retained by allocating the nonvolatile memory device to the buffer space.

Data may be stored in an area in a NAND flash memory after dividing the area into two areas according to characteristics of the data. Data received by a host may be divided into temporary data and stored data. The temporary data may be stored in an SLC area, and the stored data may be stored in an MLC area. Data in the temporary area may be moved to the storage area when a specific event occurs or a host system requests the data movement. Because the data in the temporary area is inaccessible from the outside, a design of the temporary area and the storage area may be improved or optimized in consideration of this. The flash storage controller may control a NAND flash memory after dividing the NAND flash memory into a temporary area and a storage area. A size of the temporary area may be set by a user, and may be set in consideration of a size of the temporary data generated every second and required buffering time. The host may distinguish temporary data and persistent data from each other and may transmit the temporary data and the persistent data to a flash storage. Because the temporary area is inaccessible from the outside, the temporary area may be managed in a simple and efficient manner in consideration of this. A controller of the flash storage may move data determined to be stored, among the data in the temporary data, from the temporary area to the storage area when a specific predetermined event occurs or the host system requests the data movement.

As described above, in an embedded storage device according to an example embodiment, a host system including the same, and a method operating the same, retention of temporary data may be improved or optimized by allocating a nonvolatile memory device to a buffer space when a specific event occurs.

Moreover, in the embedded storage device according to an example embodiment, the host system including the same, and the method operating the same, a large amount of temporary data may be economically retained by allocating the nonvolatile memory device to the buffer space.

While example embodiments have been shown and described above, it will be apparent to those skilled in the art that modifications and variations could be made without departing from the scope of the present inventive concept as defined by the appended claims.

What is claimed is:

1. A host system comprising:
a volatile memory device configured to store first temporary data;
an embedded storage device configured to store second temporary data; and
a host device that is remote from the volatile memory device and the embedded storage device and includes an event detection circuit configured to detect an accident event, wherein the host device is configured to determine whether to transmit new temporary data to the volatile memory device for storage therein as the first temporary data or to the embedded storage device for storage therein as the second temporary data in response to a detection signal generated by recognizing the accident event or predicting a situation, in which a large amount of temporary data is continuously required,
wherein the embedded storage device is remote from the host device and comprises:
at least one nonvolatile memory device having a buffer area, in which the second temporary data is stored, and a user area; and
a controller configured to control the at least one nonvolatile memory device such that the second temporary data in the buffer area is copied to the user area in response to a flush request of the host device.

2. The host system of claim 1, wherein the buffer area includes at least one memory block implemented as a single-level cell (SLC), and
wherein the user area includes at least one memory block implemented as a multilevel cell (MLC), a triple-level cell (TLC), a quad-level cell (QLC), or a penta-level cell (PLC).

3. The host system of claim 1, wherein the controller is configured to store the second temporary data in the buffer area in a round-robin manner.

4. The host system of claim 1, wherein the controller is configured to manage the buffer area using a head and a tail, and is configured to manage the user area using a map table for mapping a logical block address and a memory block.

5. The host system of claim 1, wherein the controller is configured to sequentially move data of the second temporary data from a head of the buffer area to a tail of the buffer area and is configured to cause the head and the tail to point to the same memory block when entire data of the second temporary data in the buffer area is copied to the user area.

6. The host system of claim 1, wherein the host device is configured to store the temporary data in the buffer area for a predetermined period of time when the accident event is associated with an event data recorder (EDR) or an accident data recorder (ADR).

7. The host system of claim 1, wherein the event detection circuit is configured to generate the detection signal when the new temporary data is data obtained from an image sensor.

8. The host system of claim 1, wherein the event detection circuit is configured to generate the detection signal when a size of the new temporary data is greater than a predetermined value.

9. An operating method of an embedded storage device, the method comprising:
  receiving a write request from a host device that is remote from the embedded storage device in response to an accident event or a situation detected by the host device in which a large amount of temporary data is continuously required;
  transmitting temporary data, corresponding to the write request, to a buffer memory;
  writing the temporary data of the buffer memory to a buffer area; and
  copying the temporary data in the buffer area to a user area when an event occurs.

10. The method of claim 9, wherein the buffer area includes first memory blocks each implemented as a single-level cell (SLC), and
  wherein the user area includes second memory blocks each implemented as a multilevel cell (MLC), a triple-level cell (TLC), a quadruple-level cell (QLC), or a penta-level cell (PLC).

11. The method of claim 10, wherein the writing the temporary data to the buffer area includes programming the temporary data in a round-robin fashion to corresponding ones of the first memory blocks.

12. The method of claim 10, wherein the copying the temporary data to the user area comprises:
  reading the temporary data from the buffer area;
  correcting an error in the read temporary data to provide error-corrected data; and
  programming the error-corrected data to a corresponding memory block among the second memory blocks.

13. The method of claim 9, further comprising: receiving information associated with the event from the host device.

14. An operating method of a host device, the method comprising:
  determining, by the host device, one of a volatile memory buffer area and a nonvolatile memory buffer area as a buffer space for temporary data in response to a detection signal generated by recognizing an accident event or predicting a situation, by the host device, in which a large amount of temporary data is continuously required;
  writing the temporary data to the nonvolatile memory buffer area that is remote from the host device when the detection signal indicates detection of the accident event; and
  flushing the temporary data in the nonvolatile memory buffer area to a nonvolatile memory user area.

15. The method of claim 14, wherein the host device includes a controller for autonomous driving,
  wherein the accident event is associated with an event data recorder (EDR) or an accident data recorder (ADR),
  wherein the volatile memory buffer area includes a dynamic random access memory (DRAM),
  wherein the nonvolatile memory buffer area includes memory blocks each implemented as a single-level cell (SLC), and
  wherein the nonvolatile memory user area includes memory blocks each implemented as a multilevel cell (MLC), a triple-level cell (TLC), a quadruple-level cell (QLC), or a penta-level cell (PLC).

16. The method of claim 14, wherein the nonvolatile memory buffer area and the nonvolatile memory user area are included in an embedded storage device, and
  wherein the writing the temporary data to the nonvolatile memory buffer area includes transmitting the temporary data to the embedded storage device.

17. The method of claim 16, wherein the flushing the temporary data in the nonvolatile memory buffer area to the nonvolatile memory user area includes transmitting a flush request to the embedded storage device.

18. The method of claim 16, further comprising:
  performing a flushing operation by copying the temporary data to the nonvolatile memory user area; and
  receiving a completion message of the flushing operation from the embedded storage device after the temporary data is copied to the nonvolatile memory user area.

* * * * *